US011252569B2

(12) United States Patent
Hoyer et al.

(10) Patent No.: US 11,252,569 B2
(45) Date of Patent: Feb. 15, 2022

(54) METHOD, SYSTEM, AND DEVICE FOR GENERATING, STORING, USING, AND VALIDATING NFC TAGS AND DATA

(71) Applicant: ASSA ABLOY AB, Stockholm (SE)

(72) Inventors: Philip Hoyer, Richmond (GB); Julian Eric Lovelock, Pleasanton, CA (US); Mark Robinton, Eden Prairie, MN (US)

(73) Assignee: ASSA ABLOY AB, Stockholm (SE)

( * ) Notice: Subject to any disclaimer, the term of this patent is extended or adjusted under 35 U.S.C. 154(b) by 195 days.

(21) Appl. No.: 16/523,390

(22) Filed: Jul. 26, 2019

(65) Prior Publication Data

US 2019/0349352 A1     Nov. 14, 2019

Related U.S. Application Data

(63) Continuation of application No. 15/819,799, filed on Nov. 21, 2017, now Pat. No. 10,652,233, which is a
(Continued)

(51) Int. Cl.
*H04W 12/30* (2021.01)
*H04L 9/32* (2006.01)
(Continued)

(52) U.S. Cl.
CPC ........ *H04W 12/35* (2021.01); *G06F 16/9566* (2019.01); *H04L 9/321* (2013.01);
(Continued)

(58) Field of Classification Search
CPC .. G06Q 20/209; G06Q 20/40; G06Q 20/0453; G06Q 20/327; H04W 12/06;
(Continued)

(56) References Cited

U.S. PATENT DOCUMENTS 6,961,000 B2    11/2005  Chung
7,295,114 B1    11/2007  Drzaic et al.
(Continued)

FOREIGN PATENT DOCUMENTS

AU    2014229568 A1    10/2015
AU    2014229575 A1    10/2015
(Continued)

OTHER PUBLICATIONS

"European Application Serial No. 14730579.1, Communication Pursuant to Article 94(3) EPC dated Apr. 12, 2019", 5 pgs.
(Continued)

*Primary Examiner* — Thanhnga B Truong
(74) *Attorney, Agent, or Firm* — Schwegman Lundberg & Woessner, P.A.

(57) ABSTRACT

A smart tag and methods of interacting with and authenticating interactions with the same are provided. The smart tag is enabled to generate a Tag Authentication Cryptogram (TAC) and include the TAC in response to a read request. Accordingly, each response generated by the smart tag will include a different TAC. It follows that interactions between the smart tag and a reading device can be authenticated as unique interactions if the TAC is validated as a unique and correct TAC.

31 Claims, 9 Drawing Sheets

Related U.S. Application Data continuation of application No. 14/772,011, filed as application No. PCT/IB2014/000812 on Feb. 21, 2014, now Pat. No. 9,860,236.

(60) Provisional application No. 61/794,371, filed on Mar. 15, 2013, provisional application No. 61/794,447, filed on Mar. 15, 2013.

(51) Int. Cl.
| | |
|---|---|
| *G06F 16/955* | (2019.01) |
| *H04L 29/06* | (2006.01) |
| *H04W 12/10* | (2021.01) |
| *H04W 12/06* | (2021.01) |
| *H04W 12/47* | (2021.01) |
| *H04W 12/106* | (2021.01) |
| *H04L 101/69* | (2022.01) |
| *H04W 12/08* | (2021.01) |
| *H04L 67/02* | (2022.01) |
| *H04W 4/80* | (2018.01) |

(52) U.S. Cl.
CPC .......... *H04L 9/3247* (2013.01); *H04L 61/609* (2013.01); *H04L 63/0492* (2013.01); *H04L 63/083* (2013.01); *H04L 63/0823* (2013.01); *H04L 67/02* (2013.01); *H04W 12/06* (2013.01); *H04W 12/08* (2013.01); *H04W 12/10* (2013.01); *H04W 12/106* (2021.01); *H04W 12/47* (2021.01); *H04L 63/12* (2013.01); *H04L 2209/805* (2013.01); *H04W 4/80* (2018.02)

(58) Field of Classification Search
CPC ..... H04W 12/08; H04W 12/10; H04W 12/35; H04W 12/106; H04W 12/47; H04L 63/083; H04L 9/321; H04L 9/3247; H04L 61/609; H04L 63/0492; H04L 63/0823; H04L 67/02; H04L 29/06; H04L 29/08; H04L 29/12; H04L 9/32; G06F 16/9566; G06F 16/955
See application file for complete search history.

(56) References Cited

U.S. PATENT DOCUMENTS

| | | | |
|---|---|---|---|
| 7,571,329 B2 | 8/2009 | Brickell et al. | |
| 7,942,312 B2 | 5/2011 | Van | |
| 7,965,184 B1 | 6/2011 | Nichols et al. | |
| 8,074,271 B2 | 12/2011 | Davis et al. | |
| 8,079,087 B1 | 12/2011 | Spies et al. | |
| 8,285,211 B2 | 10/2012 | Wang et al. | |
| 8,344,853 B1 | 1/2013 | Warner et al. | |
| 8,429,409 B1 | 4/2013 | Wall et al. | |
| 8,572,701 B2 | 10/2013 | Rathbun | |
| 8,880,027 B1 | 11/2014 | Darringer | |
| 8,880,898 B2* | 11/2014 | Smeets | G06F 21/572 713/189 |
| 9,406,046 B2 | 8/2016 | Kawaguchi et al. | |
| 9,681,302 B2 | 6/2017 | Robinton et al. | |
| 9,685,057 B2 | 6/2017 | Robinton et al. | |
| 9,703,968 B2 | 7/2017 | Hoyer et al. | |
| 9,825,941 B2 | 11/2017 | Hoyer | |
| 9,860,236 B2 | 1/2018 | Hoyer et al. | |
| 10,404,682 B2 | 9/2019 | Hoyer et al. | |
| 10,652,233 B2 | 5/2020 | Hoyer et al. | |
| 2004/0093493 A1 | 5/2004 | Bisbee et al. | |
| 2005/0061875 A1 | 3/2005 | Zai et al. | |
| 2006/0230276 A1 | 10/2006 | Nochta | |
| 2006/0277061 A1 | 12/2006 | Revanur et al. | |
| 2007/0052517 A1 | 3/2007 | Bishop | |
| 2007/0106892 A1 | 5/2007 | Engberg | |
| 2007/0180493 A1 | 8/2007 | Croft et al. | |
| 2008/0069347 A1 | 3/2008 | Brown | |
| 2008/0122584 A1 | 5/2008 | Itasaki et al. | |
| 2009/0055597 A1 | 2/2009 | Robles | |
| 2009/0108063 A1 | 4/2009 | Jain et al. | |
| 2009/0240946 A1 | 9/2009 | Yeap et al. | |
| 2010/0007466 A1 | 1/2010 | Shoarinejad et al. | |
| 2010/0079237 A1 | 4/2010 | Falk et al. | |
| 2010/0299527 A1 | 11/2010 | Arunan et al. | |
| 2011/0025458 A1 | 2/2011 | Rokhsaz et al. | |
| 2011/0074552 A1 | 3/2011 | Norair et al. | |
| 2011/0201270 A1 | 8/2011 | Perkins et al. | |
| 2011/0249682 A1 | 10/2011 | Kean et al. | |
| 2012/0013448 A1 | 1/2012 | Baranowski | |
| 2012/0159105 A1 | 6/2012 | Von Behren et al. | |
| 2012/0207305 A1 | 8/2012 | Gallo et al. | |
| 2012/0234908 A1 | 9/2012 | Wang et al. | |
| 2012/0265988 A1 | 10/2012 | Ehrensvard | |
| 2013/0039634 A1 | 2/2013 | M | |
| 2013/0061303 A1 | 3/2013 | Hart et al. | |
| 2013/0102252 A1 | 4/2013 | Rasmussen et al. | |
| 2013/0166917 A1 | 6/2013 | Granbery | |
| 2013/0215467 A1 | 8/2013 | Fein et al. | |
| 2013/0222107 A1 | 8/2013 | Herscovitch et al. | |
| 2013/0237148 A1 | 9/2013 | Mccann et al. | |
| 2013/0254116 A1 | 9/2013 | Hayhow et al. | |
| 2013/0344808 A1 | 12/2013 | Murray et al. | |
| 2014/0013406 A1 | 1/2014 | Tremlet | |
| 2014/0023195 A1 | 1/2014 | Lee et al. | |
| 2014/0075572 A1 | 3/2014 | Mehring et al. | |
| 2014/0118113 A1 | 5/2014 | Kaushik et al. | |
| 2014/0123056 A1 | 5/2014 | Puranik et al. | |
| 2014/0173708 A1 | 6/2014 | Garlick | |
| 2014/0256251 A1 | 9/2014 | Caceres et al. | |
| 2014/0282074 A1 | 9/2014 | Maher et al. | |
| 2014/0337205 A1 | 11/2014 | Tavares | |
| 2014/0357187 A1 | 12/2014 | Ehrensvard | |
| 2015/0103383 A1 | 4/2015 | Dowling et al. | |
| 2015/0208245 A1 | 7/2015 | Robinton et al. | |
| 2015/0363599 A1 | 12/2015 | Hoyer et al. | |
| 2016/0012696 A1 | 1/2016 | Robinton et al. | |
| 2016/0021091 A1 | 1/2016 | Hoyer et al. | |
| 2016/0021100 A1 | 1/2016 | Hoyer | |
| 2016/0142210 A1 | 5/2016 | Hoyer et al. | |
| 2016/0205549 A1 | 7/2016 | Hoyer et al. | |
| 2017/0118201 A1 | 4/2017 | Hoyer et al. | |
| 2018/0097797 A1 | 4/2018 | Hoyer et al. | |
| 2019/0349353 A1 | 11/2019 | Hoyer et al. | |
| 2019/0379652 A1 | 12/2019 | Hoyer et al. | |

FOREIGN PATENT DOCUMENTS

| | | |
|---|---|---|
| CA | 2905522 A1 | 9/2014 |
| CN | 102663591 A | 9/2012 |
| EP | 1710764 A1 | 10/2006 |
| EP | 2487629 A1 | 8/2012 |
| EP | 2518657 A1 | 10/2012 |
| EP | 2974219 A2 | 1/2016 |
| EP | 2974220 A2 | 1/2016 |
| EP | 2974222 A2 | 1/2016 |
| WO | WO-2008028291 A1 | 3/2008 |
| WO | WO-2011089423 A2 | 7/2011 |
| WO | WO-2012103584 A1 | 8/2012 |
| WO | WO-2013034681 A1 | 3/2013 |
| WO | WO-2013072437 A1 | 5/2013 |
| WO | 2014140818 | 9/2014 |
| WO | WO-2014140807 A2 | 9/2014 |
| WO | WO-2014140814 A2 | 9/2014 |
| WO | 2014140818 | 12/2014 |

OTHER PUBLICATIONS

"U.S. Appl. No. 14/772,995, Notice of Allowance dated Apr. 18, 2019", 5 pgs.

"European Application Serial No. 14730187.3, Communication Pursuant to Article 94(3) EPC dated Apr. 8, 2019", 4 pgs.

"European Application Serial No. 14730189.9, Communication Pursuant to Article 94(3) EPC dated May 17, 2019", 4 pgs.

(56) References Cited

OTHER PUBLICATIONS

"U.S. Appl. No. 16/523,407, Preliminary Amendment filed Jul. 26, 2019", 9 pgs.
"U.S. Appl. No. 14/772,921, Preliminary Amendment filed Sep. 4, 2015", 3 pgs.
"U.S. Appl. No. 14/772,921, Response filed Mar. 31, 2017 to Non Final Office Action dated Dec. 30, 2016", 10 pgs.
"U.S. Appl. No. 14/772,921, Notice of Allowance dated Aug. 7, 2017", 2 pgs.
"U.S. Appl. No. 16/529,297, Preliminary Amendment filed Aug. 12, 2019", 6 pgs.
"European Application Serial No. 14730187.3, Response filed Aug. 7, 2019 to Communication Pursuant to Article 94(3) EPC dated Apr. 8, 2019", 18 pgs.
"U.S. Appl. No. 15/819,799, Response filed Aug. 26, 2019 to Non-Final Office Action dated May 28, 2019", 7 pgs.
"European Application Serial No. 14730189.9, Response filed Sep. 11, 2019 to Communication Pursuant to Article 94(3) EPC dated May 17, 2019", 11 pgs.
"U.S. Appl. No. 15/819,799, Final Office Action dated Oct. 28, 2019", 7 pgs.
"U.S. Appl. No. 15/819,799, Response filed Dec. 11, 2019 to Final Office Action dated Oct. 28, 2019", 5 pgs.
"U.S. Appl. No. 15/819,799, Notice of Allowance dated Jan. 8, 2020", 4 pgs.
"European Application Serial No. 14730189.9, Communication Pursuant to Article 94(3) EPC dated May 26, 2020", 4 pgs.
"European Application Serial No. 14730187.3, Office Action dated Jun. 2, 2020", 8 pgs.
"European Application Serial No. 14730189.9, Response filed Jul. 15, 2020 to Communication Pursuant to Article 94(3) EPC dated May 26, 2020", w/ English claims, 14 pgs.
"U.S. Appl. No. 16/529,297, Non Final Office Action dated Sep. 23, 2020", 22 pgs.
"U.S. Appl. No. 14/306,078, Final Office Action dated Mar. 1, 2016", 11 pgs.
"U.S. Appl. No. 14/306,078, Non Final Office Action dated Jul. 2, 2015", 11 pgs.
"U.S. Appl. No. 14/306,078, Non Final Office Action dated Oct. 12, 2016", 14 pgs.
"U.S. Appl. No. 14/306,078, Notice of allowance dated Mar. 13, 2017", 6 pgs.
"U.S. Appl. No. 14/426,180, Final Office Action dated Sep. 8, 2016", 30 pgs.
"U.S. Appl. No. 14/426,180, Non Final Office Action dated Apr. 15, 2016", 19 pgs.
"U.S. Appl. No. 14/426,180, Notice of allowance dated Feb. 6, 2017", 11 pgs.
"U.S. Appl. No. 14/772,011, Non Final Office Action dated May 8, 2017", 13 pgs.
"U.S. Appl. No. 14/772,011, Notice of allowance dated Aug. 24, 2017", 11 pgs.
"U.S. Appl. No. 14/772,011, Preliminary Amendment filed Sep. 1, 2015", 6 pgs.
"U.S. Appl. No. 14/772,011, Response filed Apr. 10, 2017 to Restriction Requirement dated Feb. 10, 2017", 2 pgs.
"U.S. Appl. No. 14/772,011, Response filed Aug. 8, 2017 to Non Final Office Action dated May 8, 2017", 8 pgs.
"U.S. Appl. No. 14/772,011, Restriction Requirement dated Feb. 10, 2017", 8 pgs.
"U.S. Appl. No. 14/772,894, Non Final Office Action dated Aug. 8, 2016", 13 pgs.
"U.S. Appl. No. 14/772,894, Notice of allowance dated Feb. 16, 2017", 7 pgs.
"U.S. Appl. No. 14/772,921, Non Final Office Action dated Dec. 30, 2016", 26 pgs.
"U.S. Appl. No. 14/772,921, Notice of allowance dated Jul. 18, 2017", 16 pgs.
"U.S. Appl. No. 14/772,995, Final Office Action dated Mar. 26, 2018", 13 pgs.
"U.S. Appl. No. 14/772,995, Final Office Action dated Jun. 8, 2017", 15 pgs.
"U.S. Appl. No. 14/772,995, Non Final Office Action dated Sep. 12, 2018", 13 pgs.
"U.S. Appl. No. 14/772,995, Non Final Office Action dated Sep. 22, 2016", 13 pgs.
"U.S. Appl. No. 14/772,995, Non Final Office Action dated Oct. 3, 2017", 15 pgs.
"U.S. Appl. No. 14/772,995, Preliminary Amendment filed Sep. 4, 2015", 3 pgs.
"U.S. Appl. No. 14/772,995, Response filed Jan. 4, 2018 to Non Final Office Action dated Oct. 3, 2017", 8 pgs.
"U.S. Appl. No. 14/772,995, Response filed Feb. 22, 2017 to Non Final Office Action dated Sep. 22, 2016", 9 pgs.
"U.S. Appl. No. 14/772,995, Response filed Aug. 27, 2018 to Final Office Action dated Mar. 26, 2018", 8 pgs.
"U.S. Appl. No. 14/772,995, Response filed Sep. 8, 2017 to Final Office Action dated Jun. 8, 2017", 8 pgs.
"U.S. Appl. No. 14/772,995, Response filed Mar. 8, 2019 to Non Final Office Action dated Sep. 12, 2018", 12 pgs.
"U.S. Appl. No. 14/897,708, Final Office Action dated Feb. 2, 2018", 18 pgs.
"U.S. Appl. No. 14/897,708, Non Final Office Action dated Jan. 9, 2017", 16 pgs.
"U.S. Appl. No. 14/897,708, Non Final Office Action dated Aug. 3, 2017", 16 pgs.
"U.S. Appl. No. 15/308,978, Non Final Office Action dated Feb. 23, 2018", 18 pgs.
"U.S. Appl. No. 15/819,799, Non Final Office Action dated May 28, 2019", 6 pgs.
"U.S. Appl. No. 15/819,799, Preliminary Amendment filed Nov. 21, 2017", 3 pgs.
"U.S. Appl. No. 15/819,799, Response filed Mar. 18, 2019 to Restriction Requirement dated Dec. 18, 2018", 7 pgs.
"U.S. Appl. No. 15/819,799, Restriction Requirement dated Dec. 18, 2018", 7 pgs.
"Australian Application Serial No. 2014229568, Examination Report dated Feb. 8, 2017", 3 pgs.
"Australian Application Serial No. 2014229568, Office Action dated Feb. 8, 2017".
"Australian Application Serial No. 2014229575, First Examination Report dated Feb. 7, 2017", 3 pgs.
"Australian Application Serial No. 2014229575, First Examiner Report dated Feb. 7, 2017", 3 pgs.
"EMV—Integrated Circuit Card Specifications for Payment Systems. Book 2: Security and Key Management", EMVCo, LLC Version 4.2, [Online], Retrieved from the Internet: <http://www.iro.umontreai.ca/-salvaii/securite/notes2010/EMVv4.2Book2.pdf>, (Jun. 2008), 176 pgs.
"EPC Radio-Frequency Identity Protocols Generation-2 UHF RFID Specification for RFID Air Interface, Protocol for Communications at 860MHz-960MHz, Version 2.0.0 Ratified", GS1 EPCglobal Inc., (Nov. 1, 2013), 1-152.
"European Application Serial No. 14730187.3, Response filed Apr. 29, 2016 to Communication pursuant to Rules 161(2) and 162 EPC dated Oct. 28, 2015", 10 pgs.
"European Application Serial No. 14730579.1, Response filed Apr. 27, 2016 to Communication pursuant to Rules 161(2) and 162 EPC dated Oct. 28, 2015", 9 pgs.
"European Application Serial No. 14758165.6, Communication Pursuant to Article 94(3) EPC dated Dec. 8, 2016", 9 pgs.
"European Application Serial No. 14833596.1, Communication Pursuant to Article 94(3) EPC dated Mar. 23, 2018", 9 pgs.
"International Application Serial No. PCT/IB2013/001949, International Preliminary Report on Patentability dated Jan. 14, 2016", 10 pgs.
"International Application Serial No. PCT/IB2013/001949, International Search Report dated Feb. 25, 2014", 5 pgs.
"International Application Serial No. PCT/IB2013/001949, Written Opinion dated Feb. 25, 2014", 8 pgs.
"International Application Serial No. PCT/IB2013/002617, International Preliminary Report on Patentability dated Mar. 19, 2015", 8 pgs.

(56) References Cited

OTHER PUBLICATIONS

"International Application Serial No. PCT/IB2013/002617, International Search Report dated Feb. 19, 2014", 4 pgs.
"International Application Serial No. PCT/IB2013/002617, Written Opinion dated Feb. 19, 2014", 6 pgs.
"International Application Serial No. PCT/IB2014/000812, International Preliminary Report on Patentability dated Sep. 24, 2015", 8 pgs.
"International Application Serial No. PCT/IB2014/000812, International Search Report dated Sep. 18, 2014", 5 pgs.
"International Application Serial No. PCT/IB2014/000812, Written Opinion dated Sep. 18, 2014", 6 pgs.
"International Application Serial No. PCT/IB2014/000843, International Preliminary Report on Patentability dated Sep. 24, 2015", 8 pgs.
"International Application Serial No. PCT/IB2014/000843, International Search Report dated Sep. 12, 2014", 5 pgs.
"International Application Serial No. PCT/IB2014/000843, Written Opinion dated Sep. 12, 2014", 6 pgs.
"International Application Serial No. PCT/IB2014/000853, International Preliminary Report on Patentability dated Sep. 24, 2015", 10 pgs.
"International Application Serial No. PCT/IB2014/000853, International Search Report dated Sep. 17, 2014", 7 pgs.
"International Application Serial No. PCT/IB2014/000853, Written Opinion dated Sep. 17, 2014", 8 pgs.
"International Application Serial No. PCT/IB2014/001558, International Preliminary Report on Patentability dated Sep. 24, 2015", 7 pgs.
"International Application Serial No. PCT/IB2014/001558, International Search Report dated Nov. 12, 2014", 4 pgs.
"International Application Serial No. PCT/IB2014/001558, Written Opinion dated Nov. 12, 2014", 5 pgs.
"International Application Serial No. PCT/IB2014/002157, International Preliminary Report on Patentability dated Dec. 29, 2016", 8 pgs.
"International Application Serial No. PCT/IB2014/002157, International Search Report dated Feb. 17, 2015", 4 pgs.
"International Application Serial No. PCT/IB2014/002157, Written Opinion dated Feb. 17, 2015", 6 pgs.
"International Application Serial No. PCT/IB2014/002986, International Preliminary Report on Patentability dated Jan. 26, 2017", 14 pgs.
"International Application Serial No. PCT/IB2014/002986, International Search Report dated Jun. 30, 2015", 6 pgs.
"International Application Serial No. PCT/IB2014/002986, Written Opinion dated Jun. 30, 2015", 12 pgs.
"NFC Signature Record Type Definition (RTD) Technical Specification", NFC Forum, (Nov. 18, 2010), 18 pgs.
"Oberthur Technologies partners with HID Global to carry Seos digital keys on NFC SIM cards for mobile access", ASSA ABLOY, (Jul. 17, 2013), 1 pg.
Chiu, C Tan, et al., "A Robust and Secure RFID-Based Pedigree System (Short Paper)", Information and Communications Security Lecture Notes In Computer Science; Lncs, Springer, Berlin, DE, (Jan. 1, 2006), 21-29.
Emms, et al., "The Dangers of Verify PIN on Contactless Cards", Computing Science, Technical Report Series, No. CS-TR-1332, (May 2012), 14 pgs.
Falk, et al., "Application of Passive Asymmetric RFID Tags in a High-Assurance Avionics Multi-Domain RFID Processing System", RFID Systems and Technologies (RFID SysTech) 4th European Workshop, (Jun. 11, 2008), 8 pgs.

Fouladgar, et al., "A Simple Privacy Protecting Scheme Enabling Delegation and Ownership Transfer for RFID Tags", Journal of Communications, vol. 2, No. 6, (Nov. 2007), 6-13.
Kilas, et al., "Digital Signatures on NFC Tags Master of Science Thesis", [Online], Retrieved from the Internet: <http://web.it.kth.se/~johanmon/theses/kiias.pdf>, (Mar. 18, 2009), 53 pgs.
Leicher, et al., "Smart OpenID: A Smart Card Based OpenID Protocol", IFIP Advances in information and Communication Technology vol. 376, (2012), 75-86.
Muhammad, Qasim Saeed, et al., "Off-line NFC Tag Authentication", Internet Technology and Secured Transactions. 2012 International Conferece For. IEEE, (Dec. 10, 2012), 730-735.
NFC Forum, "Signature Record Type Definition Technical Specification", NFC Forum, Signature 1.0, NFCForum-TS-Signature_RTD-1.0, [Online] Retrieved from the internet: <URL: http://members.nfc-forum.org/specs/spec_license>, (Nov. 18, 2010), 18 pgs.
Pearson, "Securing the Pharmaceutical Supply Chain with RFID and Public-key infrastructure (PKI) Technologies", Texas Instruments, White Paper, (Jun. 1, 2005), 1-12 pgs.
Piramuthu, "Lightweight Cryptographic Authentication in Passive RFID-Tagged Systems", IEEE Transactions on Systems, Man, and Cybernetics: Part C: Applications and Reviews vol. 38, No. 3, (2008), 360-376.
Saeed, et al., "Off-line NFC Tag Authenticiation", The 7th International Conference for Internet Technology and Secured Transactions, 2012 International Conference for IEEE, (Dec. 10, 2012), 730-735.
Saros, et al., "A Platform for Pervasiv Infrastructures", Next Generation Mobile Applications, Services and Technologies, NGMAST '09, Third International Conference on IEEE, Piscataway, NR, USA, (Sep. 15, 2009), 83-88.
Staake, et al., "Extending the EPC Network—The Potential of RFID in Anti-Counterfeiting", Symposium on Applied Computing, (2005), 1607-1612.
Vassilev, et al., "Personal Brokerage of Web Service Access", Security & Privacy vol. 5, No. 5, (Sep. 2007), 24-31.
U.S. Appl. No. 16/523,407, filed Jul. 26, 2019, Method, System, and Device for Generating, Storing, Using, and Validating NFC Tags and Data.
"U.S. Appl. No. 16/523,407, Non Final Office Action dated Apr. 27, 2021", 13 pgs.
"U.S. Appl. No. 16/529,297, Corrected Notice of Allowability dated Feb. 23, 2021", 6 pgs.
"U.S. Appl. No. 16/529,297, Corrected Notice of Allowability dated May 3, 2021", 2 pgs.
"U.S. Appl. No. 16/529,297, Examiner Interview Summary dated Feb. 19, 2021", 2 pgs.
"U.S. Appl. No. 16/529,297, Notice of Allowance dated Jan. 22, 2021", 7 pgs.
"U.S. Appl. No. 16/529,297, Response filed Dec. 10, 2020 to Non Final Office Action dated Sep. 23, 2020", 13 pgs.
"European Application Serial No. 14730189.9, Communication Pursuant to Article 94(3) EPC dated Oct. 27, 2020", 5 pgs.
"European Application Serial No. 14730189.9, Response filed Mar. 5, 2021 to Communication Pursuant to Article 94(3) EPC dated Oct. 27, 2020", 18 pgs.
"U.S. Appl. No. 16/523,407, Response filed Jun. 21, 2021 to Non Final Office Action dated Apr. 27, 2021", 15 pgs.
"U.S. Appl. No. 16/523,407, Notice of Allowance dated Jul. 13, 2021", 9 pgs.
"European Application Serial No. 21178539.9, Extended European Search Report dated Oct. 15, 2021", 7 pgs.

\* cited by examiner

METHOD, SYSTEM, AND DEVICE FOR GENERATING, STORING, USING, AND VALIDATING NFC TAGS AND DATA

CROSS-REFERENCE TO RELATED APPLICATIONS

The present application is a continuation of U.S. patent application Ser. No. 15/819,799, filed Nov. 21, 2017, which is a continuation of U.S. patent application Ser. No. 14/772,911, filed Sep. 1, 2015, now issued U.S. Pat. No. 9,860,236, which is a national stage application under 35 U.S.C. § 371 of PCT Application No. PCT/IB2014/000812, having an international filing date of Feb. 21, 2014, and claims the benefit of U.S. Provisional Patent Application Nos. 61/794,371 and 61/794,447, each filed on Mar. 15, 2013, and the entire contents of each are hereby incorporated herein by reference.

FIELD OF TILE DISCLOSURE

The present disclosure is generally directed toward proximity-based Radio Frequency (RE) devices and methods of interacting with the same.

BACKGROUND

RF Identification (RFID) is currently the dominating technology in physical access control systems. Four standards currently dominate RFID communication: ISO/IEC 14443-A, ISO/IEC 14443-B, ISO/IEC 15693, and J15 X6319-4, each of which are hereby incorporated herein by reference in their entirety. Most access control systems installed over the last decade support one or more of these standards, or can be upgraded to support one or more of these standards. Consequently, there is a huge legacy of installed access control readers that use these standards on global basis.

The same RFID standards are used for other applications such as transport, luggage identification, ticketing, payment according to the Contactless EMV standard (Europay, MasterCard, Visa), and more.

Due to the wide spread implementation of these RFID standards, the Near-Field Communications (NFC) technology that is developed for use in mobile devices, such as smart phones and tablet devices, builds upon the same RFID standards. One could say that NFC is RFID embedded in a phone, instead of a RFID embedded in to a card, key fob, sticker or even a card reader embedded in a phone.

The NFC hardware can either be an integral part of the mobile device or phone or it can be removable (e.g., a removable NFC chip or device). NFC devices can typically operate in any one of three modes, where the first two modes are most commonly used: (1) card emulation mode; (2) read/write mode; and (3) peer-to-peer mode.

As expected, NFC tags have proliferated along with the adoption of NFC technologies in mobile devices. Most NFC tags contain data that is read by NFC-capable devices. The assurance that the tag is genuine and the data on the tag has not been tampered with is critical in certain tag-based solutions. To add security to the data stored on the NFC tag, the NFC forum describes a security standard that consists of a static signature of the data. This static signature augments the security of the original data, but has limitations in that the data ands its signature can be copied from one tag to another and still result in a successful validation. In other words, the static signature does not protect the data against replay attacks.

SUMMARY

It is, therefore, one aspect of the present disclosure to provide a smart tag with the ability to respond uniquely to discrete read requests issued by a reading device. More specifically, embodiments of the present disclosure propose a smart tag that has the ability to generate a Tag Authentication Cryptogram (TAC) and provide the TAC back to a reading device. The smart tag for each discrete read request generates a different TAC. Thus, the smart tag only issues one instance of a particular TAC to a reading device. Once the smart tag has issued the TAC in a response to a reading device, the smart tag will not include that TAC in any other responses to any other reading devices. As such, the TACs transmitted by a smart tag can be used to authenticate unique read events or interactions between a smart tag and a reading device.

It is another aspect of the present disclosure to provide an authentication service with the ability to authenticate interactions between a smart tag and reading device. More specifically, the authentication service is capable of analyzing information provided from a smart tag to a reading device to determine if the interaction between the reading device and the smart tag was a unique read event. Specifically, the authentication service is capable of analyzing a TAC and Tag Unique Identifier (TAGID) provided from the smart tag to the reading device to determine if the interaction between the reading device and smart tag is unique and that the TAC was provided by a valid smart tag (e.g., by virtue of determining that the TAC for that specific TAGID is valid). If the authentication service determines that the interaction is a unique interaction for the specific TAGID, then the authentication service may provide an affirmation of authenticity to whatever device sent the information to the authentication service for analysis. As a non-limiting example, the authentication service may inform a content server that the interaction was unique and the TAGID is valid, thereby causing the content server to provide protected content (e.g., a web page, message, document, etc.) to the reading device.

In some embodiments, the authentication service may correspond to a third-party service that authenticates interactions between a smart tag and a reading device on behalf of a content provider. Thus, the content provider can simply focus on providing content via use of the smart tags, whereas the authentication service can focus on ensuring that distributed smart tags being used by the content provider are valid and not being used illicitly. This helps the content provider ensure that their utilization of the smart tags is both secure and effective.

In one embodiment, a method of authenticating an interaction between a mobile device and a smart tag is provided that generally comprises:

receiving, at an authentication server, a Tag Unique Identifier (TAGID) and a Tag Authentication Cryptogram (TAC) generated by a smart tag in response to being read by the mobile device, wherein the TAGID and TAC are received from at least one of the mobile device and a content server;

determining, at the authentication server, that the interaction between the mobile device and the smart tag occurred and corresponds to a unique event by analyzing the TAC;

comparing, at the authentication server, the TAGID with a plurality of TAGIDs stored in a TAGID repository to determine that the TAGID is a valid TAGID; and in response to determining (i) that the interaction between the mobile device and the smart tag occurred and corresponds to a unique event and (ii) that the TAGID is a valid TAGID, transmitting a message from the authentication server indicating that the mobile device is allowed to access protected content.

As noted above, in some embodiments the TAGID and TAC are received from the content server, wherein the content server hosts one or more web pages corresponding to a Universal Resource Locator (URL) that contains the TAGID and TAC, wherein the authentication server is administered by a first entity, wherein the content server is administered by a second entity, and wherein the first and second entities are different. For instance, the first entity may be a web content provider or enterprise that administers a web service whereas the second entity may be an enterprise that administers authentication and/or validation services. When the TAGID and TAC are received from the content server, the method may further include the following steps:

determining that a second form of authentication is required;

in response to determining that a second form of authentication is required and only after the authentication service has provided the content server with the message indicating that the one or more web pages can be provided to the mobile device, issuing a second challenge to a user of the mobile device;

receiving a response to the second challenge from the user of the mobile device;

determining that the response to the second challenge matches an expected response; and in response to determining that the response to the second challenge matches the expected response, providing the one or more web pages to the mobile device.

In some embodiments, the TAC is generated by the smart tag with a pseudo-random number generator.

In some embodiments, the TAC is generated by the smart tag and the TAC is analyzed by comparing the recently-received TAC with a set of previously-received TACs to ensure that the recently-received TAC is not included in the set of previously-received TACs. In this way, the validity of the TAC can be determined without tracking a counter value at the authentication server.

In some embodiments, the TAC is received in response to the content server issuing a request for the TAC to the mobile device after the mobile device requested the one or more web pages from the content server. Moreover, the request for the TAC issued by the content server may be transmitted to the mobile device via a command embedded in a Hyper Text Markup Language (HTML) file in accordance with known Hyper Text Transport Protocol (HTTP) methods. As can be appreciated, other non-HTML files may be used to communicate the request for the TAC to the mobile device. As an example, eXtensible Markup Language (XML) files or executable commands may be embedded in one or more files transmitted from the content server to the mobile device. In still other embodiments, Dual-Tone Multi-Frequency (DTMF) tones and/or Interactive Voice Response (IVR) systems may be used to exchange a TAC between a mobile device and content server and/or a content server and/or authentication service.

In some embodiments, the authentication service receives the TAGID and TAC via a Short Message Service (SMS) message, a Multi-Media Message Service (MMS) message, an email message, DTMF tones, an IVR system, or the like. This may allow the mobile device to transmit the TAGID and TAC to the authentication service directly instead of going through the content server. Thus, it is not absolutely necessary for the authentication service to receive the TAGID and TAC from a content server using HTTP as the vehicle. Instead, the mobile device may respond to reading the smart tag by using any behavior defined within the NFC standards. For instance, the mobile device may generate and send an email, generate and send a SMS or MMS message, or the like. The email or message may be transmitted to a content server or it may be directly transmitted to the authentication service.

In some embodiments, the content server may initially receive the TAGID and TAC in a data object, such as a HTTP GET message or any similar type of message that facilitates interactions between mobile devices and servers. In some embodiments, the TAGID and TAC are embedded in a LIRE that directs a browser of the mobile device to the content server and the URL (including the TAGID and TAC) are provided to the content server. The content server can then parse the URL and extract the TAGID and TAC therefrom. Once extracted, the content server can provide the TAGID and TAC to the authentication service for analysis.

In some embodiments, a smart tag may be configured to generate a TAC in response to any number of conditions or triggers. As one example, the smart tag may generate a TAC in response to a mobile device coming into a predetermined proximity (e.g., a read range) of the smart tag. In this particular configuration, the smart tag may automatically generate a TAC every time that a mobile device is within a distance suitable to establish a bidirectional communication link with the smart phone. Thus, a new TAC may be automatically generated by the smart tag in response to detecting a mobile phone within its communication range, regardless of whether or not the mobile phone requests information from the smart tag. This means that a certain number of TACs generated by the smart tag may never be transmitted to a mobile device; instead, the smart tag will increment or move on to the next TAC when another (or the same mobile device) mobile device is into read range of the smart tag. As another example, the smart tag may be triggered to generate a TAC only in response to receiving a request for authentication from the mobile device. In this configuration, the smart tag may wait to generate a TAC unless and until a mobile device is within a read range of the smart tag and the mobile device requests that the smart tag authenticate itself to the mobile device. After the request for authentication is received from the mobile device, the smart tag may generate and transmit a TAC to the mobile device. This particular configuration does not result in the superfluous generation of TACs as compared to the first example described above.

It is still another aspect of the present disclosure to provide a method of responding to a read request from a reading device, the method comprising:

receiving, at a smart tag, a read request from a reading device;

in response to receiving the read request, generating, at the smart tag, a data object that includes tag data, a Tag Unique Identifier (TAGID), and a Tag Authentication Cryptogram (TAC), wherein the TAGID represents the smart tag at an authentication service, and wherein the TAC is generated by the smart tag with a cryptographic key and a changeable data part; and transmitting the data object from the smart tag to the reading device via a proximity-based Radio Frequency (RF) protocol, wherein the data object is transmitted to the reading device with one or more delimiters separating the tag data, the TAG ID, and the TAC.

In some embodiments, the changeable data part corresponds to a counter that increments after every use. In some embodiments, the changeable data part comprises a pseudo randomly-generated number.

In some embodiments, the cryptographic key and changeable data part are stored in a secure element of the smart tag (e.g., a secure execution environment).

In some embodiments, the data object transmitted to the reading device may be signed by the smart tag, whereas in other embodiments the utilization of a signature is not necessary.

In some embodiments, the data object is transmitted to the reading device as an NFC Data Exchange Format (NDEF) message.

In some embodiments, the tag data may include at least one of a phone number and email address. In other embodiments, the tag data, the TAGID, and the TAC are incorporated into a Universal Resource Locator (URL) and are separated by a delimiter (e.g. a slash '/').

In some embodiments, the proximity-based RE protocol may include an NFC protocol, Ultra-High Frequency (UHF) protocols, High Frequency (HF) protocols, a variation of Bluetooth (e.g., Bluetooth, Bluetooth 4, Bluetooth Low Energy (LE) or BLE, or any standard yet to be developed).

It is still another aspect of the present disclosure to provide a method of interacting with a smart device, the method generally comprising:
  generating, at a mobile device, a request to read tag data from a smart tag;
  transmitting the request to read tag data to a smart tag;
  receiving a response to the read request from the smart tag, the response comprising a data object that includes tag data, a Tag Unique identifier (TAGID) of the smart tag, and a Tag Authentication Code (TAC); and
  transmitting at least some of the response received from the smart tag to another communication device via a communication network.

In some embodiments, as described above, the tag data may include a URL and the tag data may be passed to a browser of the mobile device thereby allowing the mobile device to retrieve content from a server associated with the URL (e.g., a content server).

In some embodiments, the TAGID and TAC are transmitted to an authentication service for analysis and the method further includes receiving, from the authentication service, a message indicating that the TAC has been analyzed and the read event between the mobile device and the smart tag has been validated. In further embodiments, the tag data may only be passed to the browser in response to the authentication service determining that the read event is valid. Moreover, the server associated with the URL (e.g., a content server) may be different from a server that provides the authentication service. In such an embodiment, the content server may only provide content to the mobile device in response to the authentication service determining that the TAC is valid and the TAGID corresponds to a valid TAGID.

In some embodiments, the tag data may comprise an email address and the tag data may be provided to an email module of the mobile device thereby allowing the mobile device to insert the tag data into an address field of an email message.

In some embodiments, the tag data may comprise a phone number and the phone number may be provided to a messaging and/or phone module of the mobile device thereby allowing the mobile device to direct a message (e.g., SMS, MMS, or call-initiating message) to the phone number.

The present disclosure will be further understood from the drawings and the following detailed description. Although this description sets forth specific details, it is understood that certain embodiments of the invention may be practiced without these specific details.

DETAILED DESCRIPTION

Embodiments of the present disclosure will be described in connection with a smart tag, a system for interacting with a smart tag, and authenticating responses generated by a smart tag. While most of the discussions herein refer to a "smart tag" as being the vehicle that provides the responses to a reading device, it should be appreciated that embodiments of the present disclosure are not so limited. Indeed, any type of device having a processor and memory capable of performing the functions of the smart tag discussed herein can be utilized without departing from the scope of the present disclosure. For instance, any tag form factor may be used. Examples of such form factors include card-type tags, key fobs, wristbands, smart tags embedded in clothing or other objects, smart watches, stickers, smart phones, laptops, tablets, etc.

Figure 1A:
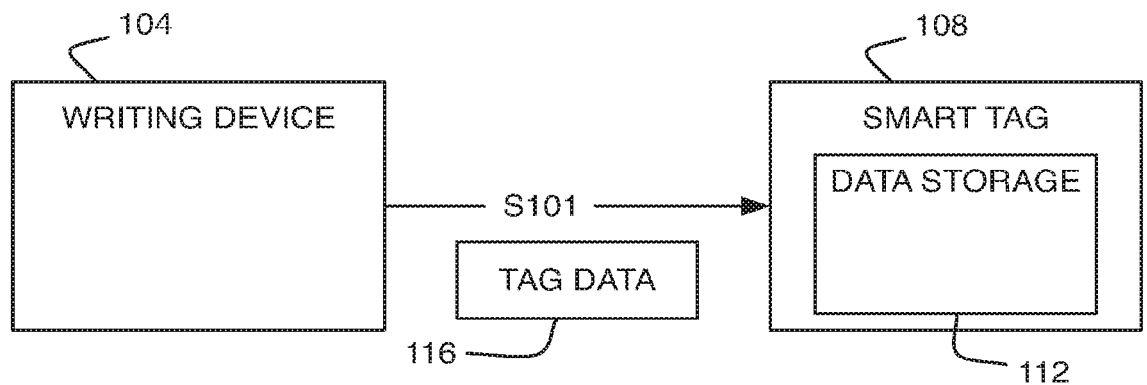
FIG. 1A is a block diagram depicting a first state of a smart tag having tag data written thereto in accordance with embodiments of the present disclosure.
Figure 1B:
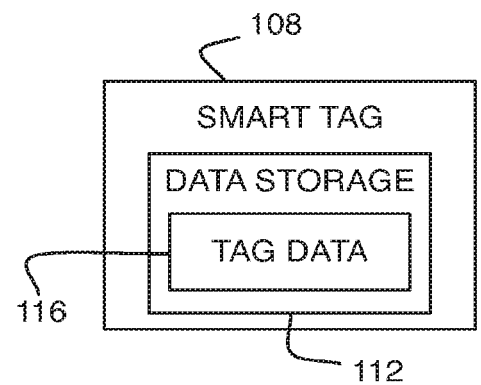
FIG. 1B is a block diagram depicting a second state of a smart tag having tag data written thereto in accordance with embodiments of the present disclosure.
Figure 1C:
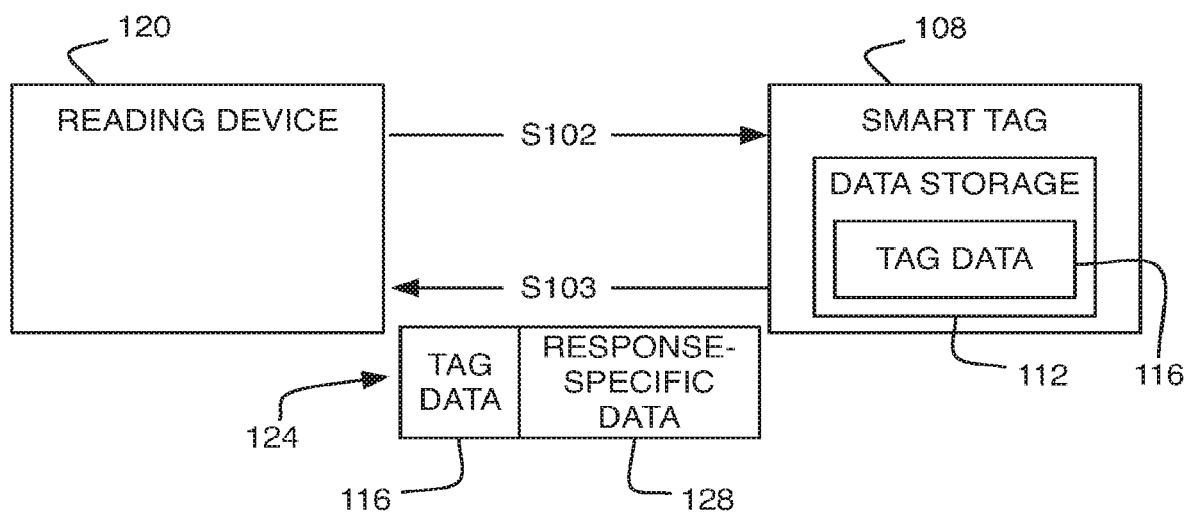
FIG. 1C is a block diagram depicting a smart tag responding to a read request from a reacting device in accordance with embodiments of the present disclosure.

With reference initially to FIGS. 1A-1C, a process for writing tag data 116 to a smart tag 108 and then reading the tag data 116 therefrom will be described in accordance with embodiments of the present disclosure. The process begins with a first step of writing the tag data 116 to the smart tag 108 as shown in FIG. 1A. More specifically, a writing device 104 may be used to establish a communication channel with the smart tag 108. In some embodiments, the communication channel established between the writing device 104 and smart tag 108 may correspond to a RF inductive coupling between antennas of each device. The inductive coupling between the writing device 104 and smart tag 108 may depend upon a relative proximity of the two devices. Thus, the communication channel may correspond to a wireless communication channel. Other wireless and RE-based proximity protocols such as Bluetooth, WiFi (e.g., IEEE 802.11N), and the like may also be used to establish a communication channel between the writing device 104 and smart tag 108. The channel may be established directly between the two devices or it may be established indirectly (e.g., by passing through a wireless router, server, and/or the like). In other embodiments, the communication channel may be wired (e.g., via a Universal Serial Bus (USB) wire, Ethernet wire, etc.).

In some embodiments, the writing device 104 may correspond to any type of electro-mechanical device capable of interacting with the smart tag 108. Regardless of whether the communication channel is a wired or wireless channel, the process begin with the writing device 104 writing the tag data 116 to the smart tag 108 (step S101). The tag data 116 may be written to the smart tag 108 by use of a write command or equivalent Application Protocol Data Unit (APDU) that is retrieved from memory of the writing device 104 when the communication channel is established between the writing device 104 and smart tag 108.

Upon receiving the tag data 116, the smart tag 108 may store the tag data 116 in a local data storage location 112, as is shown in FIG. 1B. In some embodiments, the data storage 112 may correspond to volatile or non-volatile memory. Even more specifically, the data storage 112 may correspond to a secure memory location of an Integrated Circuit (IC). In such an embodiment, the smart tag 108 may correspond to an Integrated Circuit Card (ICC).

After the tag data 112 has been stored in the data storage 112, the smart tag 108 is capable of providing the tag data 116 back to a reading device 120 upon receiving a read request as shown in FIG. 1C. More specifically, a reading device 120 may issue a read request to the smart tag 108 (step S102) via a communication channel established between the reading device 120 and smart tag 108. The communication channel established between the reading device 120 and smart tag 108 may be a wired or wireless communication channel. In some embodiments, the nature of the communication channel used by the reading device 120 may be similar to the communication channel used by the writing device 104. In some embodiments, the reading device 120 may correspond to the same or a similar type of device as the writing device 104, but operating in a reading mode instead of a writing mode. Alternatively, the reading device 120 may be a different type of device as compared to the writing device 104. As an example, the reading device 120 may correspond to a mobile communication device (e.g., smart phone, tablet, laptop, Personal Digital Assistant (PDA), smart watch, remote control, smart vehicle or car, etc.). In some embodiments, the reading device 120 may communicate with the smart tag 108 using RF inductive coupling (e.g., at frequencies of 125 kHz, 13.56 MHz, etc.). Other protocols such as Bluetooth and/or WiFi may also be used to facilitate communications between the reading device 120 and smart tag 108.

When the smart tag 108 receives the read request from the reading device 120, the smart tag 108 may generate a data object 124 and provide the data object back to the reading device 120 as a response to the read request (step S103). The nature of the data object 124 may depend upon the nature and structure of the tag data 116. Furthermore, although FIG. 1C shows that the data object 124 includes the entirety of the tag data 116, it should be appreciated that less than all of the tag data 116 may be included in the data object 124 and still be considered tag data.

Regarding the nature of the tag data 116, the format may vary depending upon the environment in which the smart tag 108 is being used. Illustrative examples of tag data 116 may include a URL, email address, phone number, or combinations thereof. Moreover, the tag data 116 may include instructions to be executed by the reading device 120 upon receiving the tag data 116. As an example, the tag data 116 may include relatively simple instructions that cause the reading device 120 to insert other parts of the tag data 116 (e.g., the URL, email address, phone number, etc.) into a particular message or message type. As such, the tag data 116 may include multiple portions, some of which may be used by the reading device 120 and others of which may be executed by the reading device 120.

As will be discussed in further detail herein, the data object 124 may further include response-specific data 128. The response-specific data 128 may correspond to a portion of data that changes in each response or data object 124 prepared by the smart tag 108 when the smart tag 108 is operating properly. In some embodiments, the tag data 116 may correspond to a URL, email address, phone number or the like and the response-specific data 128 may correspond to a TAC, a combination of an TAC and a TAGID of the smart tag 108, or a combination of an TAC with an identifier of a company or person that is responsible for distributing the smart tag 108.

In some embodiments, the data object 124 may be formatted similarly to the tag data 116 itself. For instance, if the tag data 116 corresponds to a URL, then the data object 124 may also be formatted as a URL and the response-specific data 128 may be separated from the tag data 116 using one or more delimiters commonly used in URLs (e.g., backward slashes, semicolons, hyphens, etc.).

In some embodiments, the data object 124 may be generated and sent by the smart tag 108 as one or more NDEF messages (which may have one or more NDEF records) or individual NDEF records. More specifically, the data object 124 may be structured in accordance with the NFC standards described herein above and incorporated herein by reference. The tag data 116 may correspond to a first record (e.g., Record 1) in the data object 124 and the response-specific data 128 may correspond to a second record (e.g., Record 2) in the data object 124. As mentioned above, it may also be possible to create a single record that incorporates both the tag data 116 and response-specific data. 128 into a single record with one or more delimiters separating the two pieces of data within the record. Each record in the data object 124 may comprise a header and payload, where the payload comprises the tag data 116 and/or response-specific data 128 and the header includes an identifier, length, and type to describe the payload. Thus, where both the tag data 116 and response-specific data 128 are incorporated into a single NDEF record, the payload of the single NDEF record may both data pieces and the header may describe information about both data pieces. Even where the tag data 116 includes an email address or phone number, the data object 124 may be formatted as a Universal Resource Indicator (URI).

Upon reading the data object 124 from the smart tag 108, the reading device 120 may be configured to perform one or many functions in response to reading the data object 124. As will be discussed in further detail herein, the reading device 120 may initiate a process of navigating to a web server associated with a URL contained in the data object 124, sending an email or message to a device associated with a phone number or email address in the data object 124, or execute some other task based on instructions contained within the data object 124.

Figure 2:
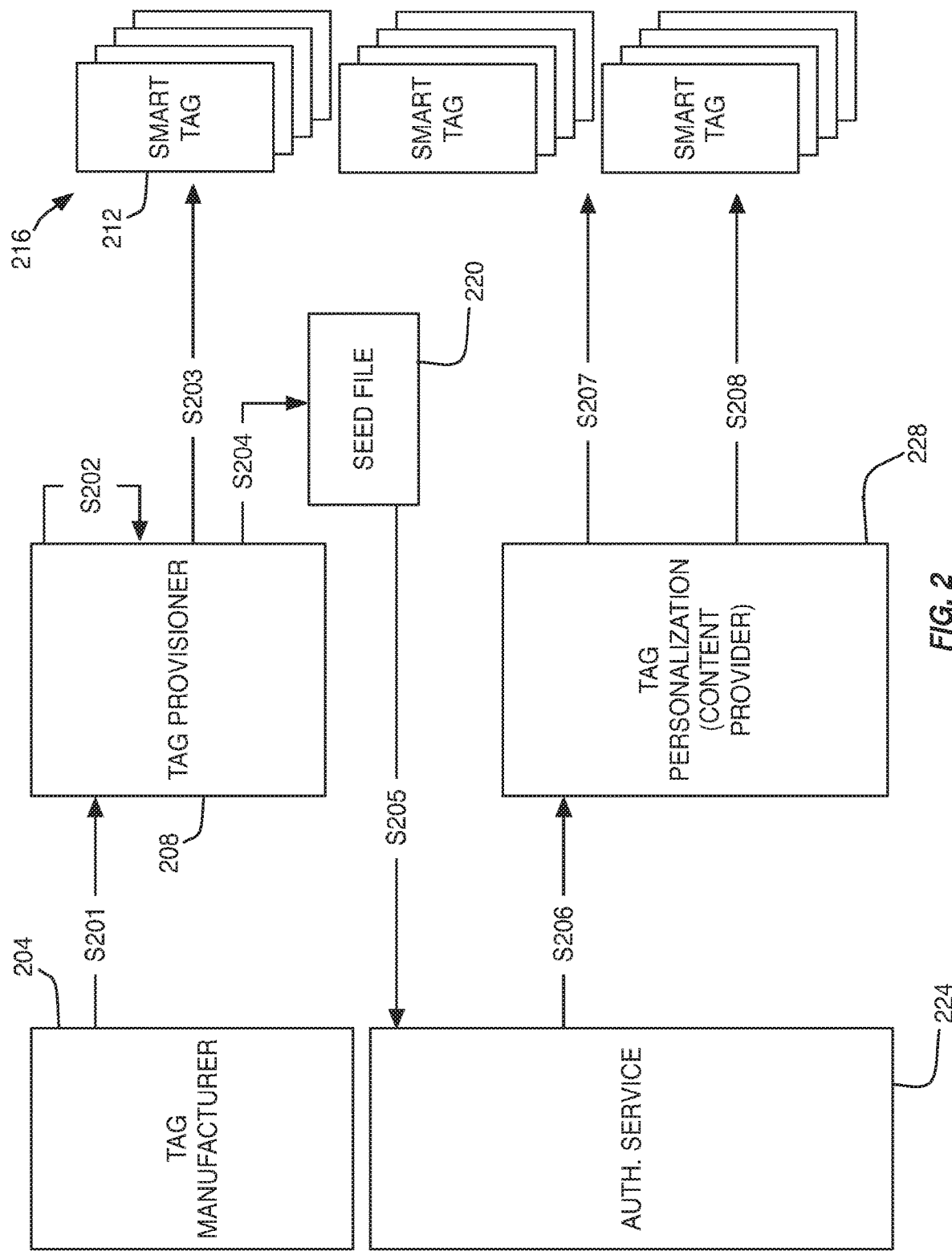
FIG. 2 is a block diagram depicting a tag manufacturing and personalization process in accordance with embodiments of the present disclosure.

Prior to describing the nature and behavior of the reading device 120, it is important to understand the tag manufacturing, provisioning, and personalization process. Accordingly, with reference now to FIG. 2, a tag manufacturing and personalization process will be described in accordance with embodiments of the present disclosure. The process begins with a tag manufacturer 204 manufacturing one or multiple smart tags 212 (step S201). In particular, the tag manufacturer 204 may develop smart tags 212 in any format such as: card-type tags, key fobs, wristbands, smart tags embedded in clothing or other objects, smart watches, stickers, smart phones, laptops, tablets, or combinations thereof.

Once manufactured by the tag manufacturer, the tags are received by a tag provisioner 208. In some embodiments, the entity acting as the tag manufacturer 204 may also act as the tag provisioner 208. In other embodiments, the entity acting as the tag manufacturer 204 may be different from the entity acting as the tag provisioner 208. In the latter scenario, the smart tags 212 may need to be shipped or otherwise delivered to the tag provisioner 208 for processing.

For each smart tag 212 being provisioned, the tag provisioner 208 may first generate a TAC seed (step S202). In this particular step, the tag provisioner 208 may generate a seed value for each smart tag 212 being provisioned. The seed value may be globally unique or a seed value derived from a predetermined algorithm. In some embodiments, the seed value generated for a smart tag 212 may include a card TAC key as well as a random initial counter value. This seed value is then written to the smart tag 212 (step S203). In some embodiments, the seed value written to the smart tag 212 may include response-specific data 128 as described above. As an example, the tag provisioner 208 may write the seed value to the smart tag 108 so that it is stored in data storage 112 of the smart tag 108. The seed value is also stored by the tag provisioner 208 such that it can be referenced at a later time (e.g., by an authentication service 224).

In some embodiments, the seed value for each smart tag 212 is stored in a seed file 220 (step S204) by the tag provisioner and then the seed file 220 is communicated to the authentication service 224 (step S205). It should be appreciated that the order in which steps S203, S204, and S205 does not matter. For instance, the seed file 220 may be generated prior to writing the seed value to the smart tag 212. In other instances, it may be desirable to write the seed value to the smart tag 212, confirm the appropriate seed value has been written to the smart tag 212, and only thereafter generate the seed file 220. In other embodiments, a single seed file 220 may be generated for an entire batch 216 of smart tags 212 provisioned by the tag provisioner 208. Thus, steps S204 and S205 may not be performed until after an entire batch 216 of smart tags 212 have been provisioned.

The seed file 220 may correspond to any type of data structure capable of storing one or more seed values that have been written to smart tags 212 as well an identifier of the smart tag that had the seed value written thereto (e.g. TAGID). As some non-limiting examples, the seed file 220 may correspond to a Portable Symmetric Key Container (PSKC RFC 6030) file (e.g., a portable and standardized eXtensible Markup Language (XML)-based key container) that associates smart tags 212 (or their identifiers or TAGIDs) with the seed value written thereto.

The seed file 220 is then received by the authentication service 224 such that the authentication service 224 can provide authentication services to a tag personalization entity 228 that will ultimately use deploy the smart tags 212 for use. In some embodiments, the entity acting as the tag provisioner 208 may also provide the authentication service 224. In other embodiments, the entity acting as the tag provisioner 208 may be different from the entity providing the authentication service 224. When the entities are different, the smart tags 212 may also be delivered to the authentication service 224. Alternatively or additionally, the smart tags 212 may be delivered directly to the tag personalization or content provider 228 to be personalized for deployment. Delivery of the smart tags 212 to the tag personalization or content provider 228 may be done by the tag provisioner 208 or the authentication service 224 (step S206).

Upon receiving the smart tags 212, the tag personalization or content provider 228 may personalize each smart tag 212 with personal content. More specifically, the tag personalization or content provider 228 may write tag data 116 to memory of the smart tag 212 (step S207). Thus, the tag personalization or content provider 228 may write the tag data 116 to the smart tag 212 using a writing device 104 as described in connection with FIG. 1A. The tag data 116 written in this step may include a URL, email address, phone number, executable instruction, or some combination thereof. The tag personalization or content provider 228 may then write protect the data written to the smart tag 212 (step S208). In particular, the tag personalization or content provider 228 may provide an instruction to the smart tag 212 that does not allow the tag data 116 written thereto to be re-written.

It should be noted that the entity acting as the content provider 228, in most situations, is usually different from the entity acting as the authentication service 224. Moreover, the content provider 228 is usually different from any other entity involved in the smart tag manufacturing and provisioning process. It should be appreciated, however, that the entity acting as the content provider 228 may also act as the authentication service 224 without departing from the scope of the present disclosure.

Figure 3:
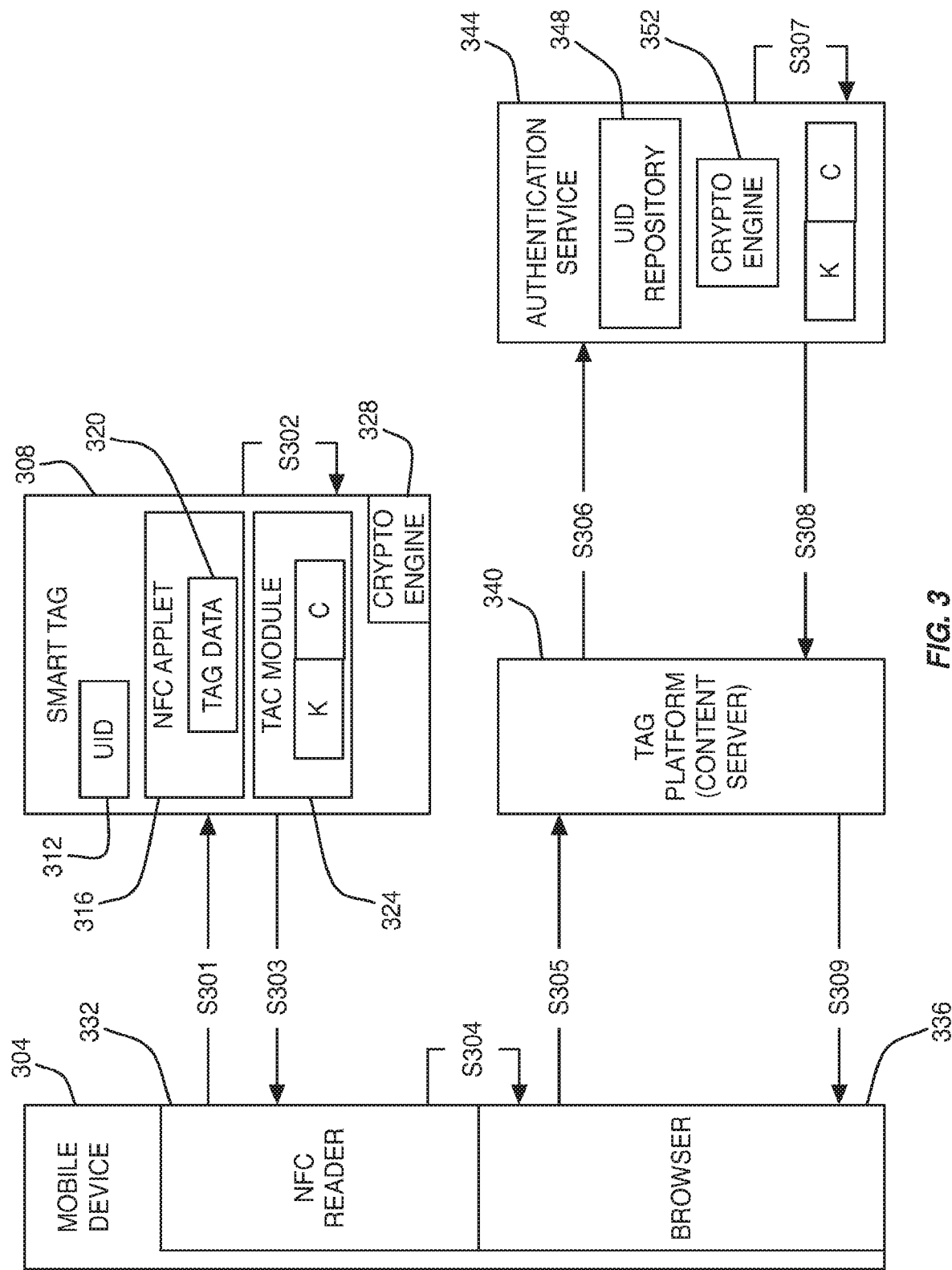
FIG. 3 is a block diagram depicting an authentication process in accordance with embodiments of the present disclosure.

After the smart tags 212 have been manufactured and provisioned, the smart tags 212 can be deployed in the field for use in accordance with uses designed by the tag personalization and content provider 228. Thus, with reference now to FIG. 3, a process of using smart tags 212 and authenticating interactions therewith will be described in accordance with embodiments of the present disclosure.

The process begins when a mobile device 304 issues a read request to a smart tag 308 (step S301). The mobile device 304 may be similar or identical to the reading device 120. Similarly, the smart tag 308 may be one of the smart tags 212 that have been manufactured and provisioned in accordance with the process flow described in FIG. 2. The read request may be embodied in several different ways. As one example, the mobile device 304 may issue a request to read only a TAGID 312 of the smart tag 308. Upon receiving the TAGID 312 of the smart tag 308, the mobile device 304 may authenticate the smart tag 308 by determining the received TAGID 312 corresponds to a trusted and valid TAGID and then, in response thereto, the mobile device 304 may issue a second part of the read request that requests the tag data 320 from the smart tag 308. As another example, the mobile device 304 may send a single request asking the smart tag 308 to respond with tag data 320 and a TAGID 312.

Upon receiving the request, the smart tag 308 may invoke its NFC applet 316, which subsequently invokes a TAC module 324 that is also resident on the smart tag 308 (step S302). The NFC applet 316 may correspond to an application or portion of executable code that enables the smart tag 308 to emulate functionality of an NFC tag, perhaps in accordance with ISO 7816, the entire contents of which are hereby incorporated herein by reference. The TAC module 324 may correspond to code contained within the smart tag 108 (and possibly written thereto during provisioning by the tag provisioner 208) that is capable of generating unique responses to read requests on behalf of the smart tag 308. In some embodiments, the TAC module 324 may comprise a unique cryptographic key K and a counter value C and the TAC module 324 may utilize the cryptographic key K and counter value C along with the assistance of a cryptographic engine 328 to create a data object 124 that can be provided back to the mobile device 304 in step S303.

More specifically, the cryptographic key K may correspond to a symmetric encryption key of length N bytes that is substantially unique to the smart tag 308 on which it is written. In some embodiments, the cryptographic key K may correspond to at least some of the seed value written to the smart tag 308 during provisioning. Likewise, the counter value C may also correspond to a random initial value assigned to the smart tag 308 during provisioning or any incremented value obtained as the smart tag 308 generates responses to devices. In other words, the counter value C may change according to use of the smart tag 308 such that the counter value C is never the same value twice during the life of the smart tag 308; thereby ensuring that the smart tag 308 continues to generate substantially unique responses to each read request. Thus, the seed value may correspond to the combination of the cryptographic key K and the counter value C initially written to the smart tag 308 during provisioning. This process essentially defines what TAC or pseudo random number that is generated by the smart tag 308.

In other embodiments, the counter value C may correspond to a changeable data part that is not necessarily incremented after each use by the smart tag 308. Instead, the counter value C may correspond to a pseudo-randomly generated value that is computed each time the smart tag 308 is preparing a response. Thus, the counter value C may actually correspond to the output of a pseudo-random number generator as opposed to a value that increments by a predetermined amount (e.g., one, two, three, . . . , ten, etc.) after each use. In either event, the counter value C is intended to change and be substantially unique on a per-transaction basis.

The cryptographic engine 328 is designed to compute a TAC, once invoked by the TAC module 324, based on inputs K and C provided by the TAC module 324. Even more specifically, when the TAC module 324 is invoked by the NFC applet 316, the TAC module 324 may provide the cryptographic key K and the current counter value C (or pseudo-randomly-generated number) to the cryptographic engine 328 which utilizes a cryptographic mechanism that is a hash function that takes an arbitrary block of data (e.g., K and C) and returns a fixed-size bit string, the cryptographic hash value, such that any (accidental or intentional) change to the data will (with very high probability) change the output hash value. Non-limiting examples of cryptographic mechanisms that may be used as the cryptographic engine 328 include MD5, SHA-1, SHA-2, SHA-3, SHA-256, keyed-hash message authentication codes (HMACs), or any other 128, 256, or 512-bit encryption algorithm. The cryptographic engine 328 returns a value based on the inputs K and C that is provided to the NFC applet 316.

Upon receiving the results from the cryptographic engine 328, the NFC applet 316 formats a response for the mobile device 304 that includes the tag data 320 as well as the results received from the cryptographic engine 328 (e.g., the TAC). The NFC applet 316 then prepares the data object 124 to be provided to the mobile device 304 in step S303. More particularly, the TAC may correspond to the response-specific data 128 in the data object 124 whereas the tag data 320 and TAGID 312 may correspond to the non-response-specific data. As a non-limiting example, the message transmitted back to the mobile device 304 may be formatted for transmission via NFC, Bluetooth, or some other proximity-based RF communication protocol. Even more specifically, the message transmitted back to the mobile device 304 in step S303 may comprise one or more NDEF records having the tag data 320, TAGID 312, and TAC. As a specific non-limiting example, the response may be formatted as a URL according to the following:

URL=StaticURL+/+TAGID+/+TAC

Where the StaticURL may correspond to the tag data 320 (e.g., a URL written to the smart tag 308 by the tag personalization or content provider 228 which points to a content server 340), the TAGID may correspond to the TAGID 312 of the smart tag 308 (e.g., an identifier that is specific to the smart tag 308), and the TAC may correspond to the TAC that is unique to the current interaction between the smart tag 308 and mobile device 304. As shown above, the tag data 320, TAGID 312, and TAC may be separated by delimiters or some other identifiers that allow the individual components to be separated out of the URL. As can be appreciated, formats other than a URL (e.g., phone number, email address, etc.) may be used without departing from the scope of the present disclosure.

In some embodiments, the response provided to the mobile device 304 is unsigned. In other embodiments, the response provided to the mobile device 304 includes the response data as well as a data signature. For instance, the TAC can be added in the data to be signed. The signed data can then reference the signing certificate with the URL=Static URL/tagID/TAC, in other embodiments, the data signature may be calculated based on the TAC generated by the TAC module 324. If signed, the mobile device 304 may analyze the data signature to ensure that the signature is authentic. In other words, if the mobile device 304 determines that the data signature is not authentic, then it will not take any further action. On the other hand, if the response signature is authentic or no signature is utilized, then the process will continue with the mobile device 304 passing some or all of the data contained in the response from an reader module 332 to a browser 336 or other appropriate application on the mobile device 304 (step S304).

In some embodiments, the browser 336 or other appropriate application (e.g., email application, SMS application, phone application, etc.) utilizes the information contained in the response (e.g., the URL) to navigate or send request for content to a content server 340 (step S305). Where a browser 336 is used, the request received at the content server 340 may be formatted as an HTTP GET request having the tag data 320, TAGID 312, and TAC formatted as a single URL. Upon receiving the request for content at step S305, the content server 340 may analyze the TAC and/or TAGID 312 to determine if the interaction between the mobile device 304 and the smart tag 308 was a unique interaction (e.g., by analyzing the TAC) and that the smart tag 308 is a valid and trusted tag (e.g., by analyzing the TAG ID). Alternatively or additionally, or more probably, the content server 340 may be hosted by a first entity that is responsible for deploying smart tags 308 and providing content in association with such a deployment. The first entity may not be positioned to authenticate the smart tag 308 or whether the interaction between the smart tag 308 and mobile device 304 is a unique interaction. More specifically, the first entity hosing the content server 340 may correspond to the same entity that is the content provider 228. Thus, the first entity hosting the content server 340 may provide some or all of the content received in step S305 to an authentication service 344 (step S306). The authentication service 344 may be provided by a second entity (different from the first) that is solely responsible for authenticating smart tags 308 (e.g., by analyzing the TAGIDs) and determining whether interactions with such tags are unique (e.g., by analyzing the TACs). In some embodiments, the second entity providing the authentication service 344 may be the same as the entity providing authentication service 224 and possibly the same entity that also provided the tag provisioning service via tag provisioner 208. Thus, different entities may host the content server 340 and server that provides the authentication service 314. In such a scenario, one, two, three, or more network border elements (e.g., Session Border Controllers (SBCs), gateways, firewalls, etc.) may be provided between the content server 340 and authentication service 344. In other words, the content provided from the content server 340 to the authentication service 344 may traverse one, two, three, or more network border elements as it traverses boundaries of different networks administered by different entities.

The authentication service 344 may comprise a TAGID repository 348 along with its own cryptographic engine 352. The cryptographic engine 352 may be similar or identical to the cryptographic engine 328 of the smart tag 308, thereby enabling the authentication service 344 to check TACs generated by the smart tag 308. More specifically, when the authentication service 344 receives a request for authentication of a smart tag interaction in step S306, the authentication service 344 may compare the TAGID received in the request for authentication to one or more TAGIDs contained in the TAGID repository 348 to determine whether the smart tag 308 that provided the response to the mobile device 304 is a valid and known smart tag. Additionally, the authentication service 344 may invoke its cryptographic engine 352 to generate an TAC based on its internally-maintained K and C values, which should match the K and C values of a valid smart tag 308 (step S307). If the TAC generated by the cryptographic engine 352 matches the TAC received in step S306, then the authentication service 344 can verify that the interaction between the smart tag 308 and mobile device 304 was a unique interaction (e.g., there was no replay of a TAC by the mobile device 304).

In some embodiments where the counter value C is incremented at the TAC module 324, the counter value C at the authentication service 344 is incremented for each response it receives. Thus, the counter values C at each device should maintain a certain amount of synchronization. Alternatively, where a pseudo-random number generator is used by the smart tag 308, TAC can be based on a pseudo-randomly generated number or a true random number. It should be appreciated that the authentication service 344 may be allowed to verify the validity of an TAC without necessarily generating its own TAC. Instead, the authentication service 344 may maintain a listing of previously-received TACs. This list may be kept indefinitely or it may comprise only a fixed number of TACs from previous interactions (e.g., the last 200 TACs). If the authentication service 344 receives an TAC that it has previously received (e.g., that is already found in the list of previously-received TACs), then the authentication service 344 may identify the TAC as invalid. In some embodiments, the authentication service 344 utilizes information from the seed file 220 received during tag provisioning to populate the TAGID repository 348 as well as determine whether TACs received from the content server 340 are valid.

After the authentication service 344 has analyzed the TAGID and TAC receive in step S306, the authentication service 344 may send a response back to the content server 340 that indicates whether the interaction was unique and whether the smart tag 308 is a valid smart tag (step S308). As with the request transmitted in step S306, the response transmitted in step S308 may traverse one, two, three, or more network border elements as it moves from one entity to another.

If the authentication service 344 validates both the tag and the interaction, then the content server 340 may continue with providing the requested content (e.g., a web page, HTML document, XML file, etc.) back to the mobile device 304 (step S309). As an embellishment, even if the authentication service 344 validates the interaction as unique and the smart tag 308 as a valid smart tag, the content server 340 may still require additional inputs (e.g., user name, password, PIN, etc.) from the browser before the content is released to the mobile device 304. Thus, additional interactions (not shown in FIG. 3) may occur before the content server 340 provides the mobile device 304 with the requested content. In other embodiments, the content server 340 may provide the requested content immediately upon receiving validation from the authentication service 344.

If, on the other hand, the content server 340 does not receive validation from the authentication service 344 as to the uniqueness of the interaction and the validity of the smart tag 308, the content server 340 may not provide the requested content or the content server 340 may issue an error message back to the mobile device 304 in step S309. Furthermore, in accordance with HTTP rules, if no response is received from the authentication service 344 within a predetermined amount of time, the content server 340 may provide a timeout or error message back to the mobile device 304 in step S309.

Figure 4:
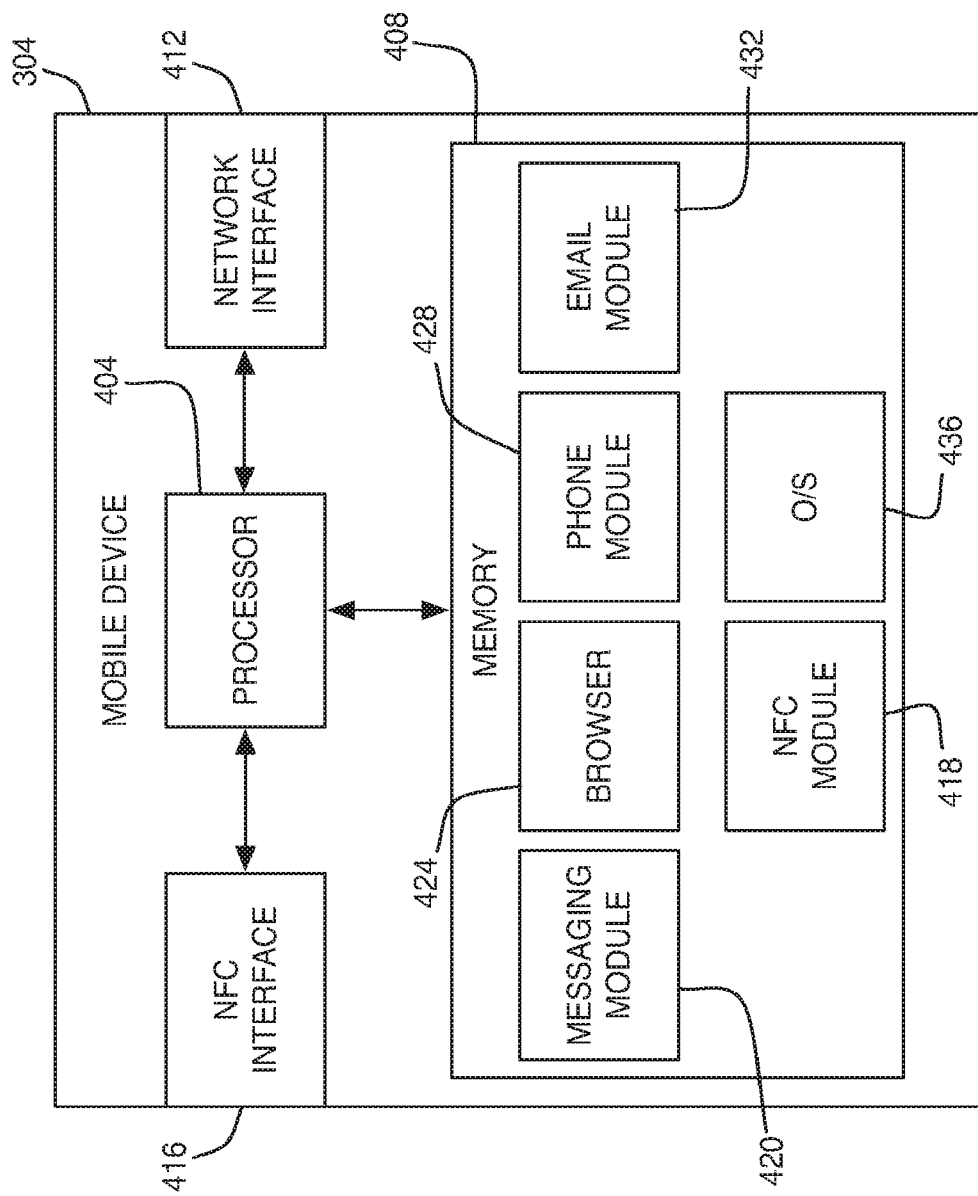
FIG. 4 is a block diagram depicting an NFC-capable device in accordance with embodiments of the present disclosure.

With reference now to FIG. 4, additional details of a mobile device 304 will be described in accordance with embodiments of the present disclosure. The mobile device 304 may correspond to a mobile communication device such as a cellular phone, smart phone, tablet, laptop, or any other device that is NFC-enabled, Bluetooth-enabled, or otherwise configured to communicate via one or more proximity-based RE communication protocols or non-proximity-based RF communication protocols such as ZigBee, for example. The mobile device 304 is depicted as comprising a processor 404, memory 408, an NFC interface 416, and a network interface 412. In some embodiments, the processor 404 may correspond to a plurality of processors, each configured to perform certain operations for the mobile device 304. As an example, the mobile device 304 may have dedicated processors for its NFC functions and other functions. In some embodiments, the components of the mobile device 304 may be connected together via a data bus or similar architecture. Thus, although the components are depicted as being connected via the central processor 504, such an arrangement of components is not required.

The processor 404 may correspond to a microprocessor, Central Processing Unit (CPU), collection of processors or CPUs, or the like. In some embodiments, the processor 404 may be configured to execute instructions stored in memory 408, thereby providing functionality to the mobile device 304.

The memory 408 may comprise a number of modules or instruction sets (e.g., applications, drivers, etc.) stored therein. In some embodiments, the memory 408 may include volatile and/or non-volatile memory. As some non-limiting examples, the memory 408 may include an NFC module 418, a messaging module 420, a browser 424, a phone module 428, an email module 432, and an Operating System (O/S) 436.

The NFC module 418 may comprise instructions that, when executed by the processor 404, enable the NFC functionality of the mobile device 304. For instance, the NEC module 418 may be responsible for causing the mobile device 304 to operate in a card emulation mode, a read/write mode, and/or a peer-to-peer mode. The NFC module 418 may also correspond to a specific portion of memory where sensitive data normally communicated via NFC (e.g., key(s), encryption algorithms, PINs, credit card numbers, payment authorization information, other transaction data, etc.) is securely stored on the mobile device 304. As an example, the NFC module 418 may include a secure element such as a card or an embedded secure element where NFC data is stored in an encryption fashion. Thus, the NFC module 418 may correspond to specific memory or memory locations in addition to providing the executable instructions for the processor 404. Alternatively or additionally, the NFC module 418 may be replaced with or supplemented with a Bluetooth module that enables the mobile device 304 to communicate with other devices (e.g., the smart tag 308) via Bluetooth. It should be appreciated that the mobile device 304 may be equipped for both Bluetooth and NFC communications. In some embodiments, the Bluetooth communications may occur via the network interface 412 or the NFC interface 416.

When executed, the NFC module 418 or Bluetooth module may cause the processor 404 to exchange information with other devices according to known NFC or Bluetooth protocols via the NFC interface 416 or network interface 412. Where NFC is employed, the NFC interface 416 may include a coil or antenna that creates an inductive coupling with other RE-enabled devices. The size of the NFC interface 416 may depend upon the overall size of the mobile device 304 as well as other antennas (e.g., network interface 412) contained within the mobile device 304.

The other phone functionality of the mobile device 304 may be provided by the other modules 420, 524, 528, 532 and O/S 436 stored in memory 408. As examples, the O/S 436 may correspond to a mobile operating system specifically designed for smart phones or the like. Non-limiting examples of an O/S 436 include Android®, iOS®, BlackberryOS®, Windows®, Windows Mobile®, and the like. The O/S 436 may be responsible for providing the basic functionality of the phone (e.g., controlling user input and output functions, microphone functions, coordinating drivers, etc.) in addition to coordinating operations of the applications and other modules stored in memory 408.

The messaging module 420 may correspond to an application that enables the mobile device 304 to communication SMS, MMS, and other messages via a cellular communication network. Alternatively or additionally, the messaging module 420 may utilize social media channels.

The browser 424 may provide the mobile device 304 with the ability to browse the Internet, for example. The browser 424, in some embodiments, corresponds to an application that enables the mobile device 304 to exchange information with servers and other data providers over a communication network using known Internet Protocols (e.g., HTTP, HTML, XML, etc.), Non-limiting examples of browsers 424 include Internet Explorer®, Safari®, Google Chrome®, mobile versions thereof, etc.

The phone module 428 may provide the mobile device 304 with the ability to initiate and respond to calls (e.g., voice calls, video calls, multi-media collaborations, etc.). The phone module 428 may also enable a user to perform advanced communication functions such as accessing voicemail, establishing conference calls, etc.

The email module 432 may provide the mobile device 304 with the ability to exchange electronic mail messages with other devices over a communication network. As examples, the email module 432 may specifically support email communications. It should also be appreciated that the email module 432 may be combined with the messaging module 420 to support other types of communications such as social media communications (e.g., Facebook®, Twitter®, etc.), Short Message Service (SMS) messaging, Multimedia Messaging Services (MMS), and so on.

Communications between the mobile device 304 and a broader communication network may be facilitated by the network interface 412, which may actually include several interfaces to different networks or network types. For instance, the network interface 412 may comprise a cellular network interface that enables the mobile device 304 to interact with a cellular network, which is usually provided by a Mobile Network Operator (MNO). Alternatively or additionally, the network interface 412 may comprise a Bluetooth interface, Infrared interface, etc. The network interface 412 may alternatively or additionally include an 802.11N interface (e.g., Wi-Fi interface), a Universal Serial Bus (USB) port, or any other wired or wireless interface to the communication bus of the mobile device 304.

Figure 5:
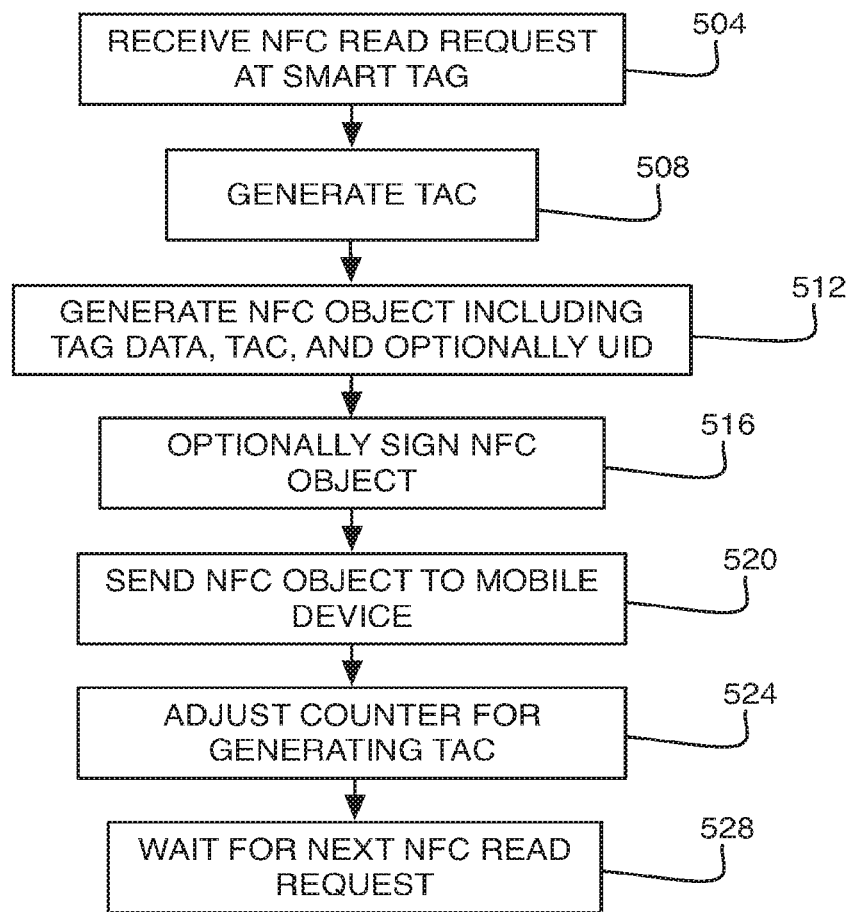
FIG. 5 is a flow diagram depicting a method of operating a smart tag in accordance with embodiments of the present disclosure.

With reference now to FIG. 5, a method of responding to a read request with a smart tag 308 will be described in accordance with embodiments of the present disclosure. The method begins when a smart tag 308 receives a read request from a mobile device 304 (step 504). The read request may be similar or identical to the request received in step S301.

Upon receiving the read request, the smart tag 308 invokes its TAC module 324 and cryptographic engine 328 to generate an TAC that is unique to the read request just received from the mobile device (step 508). In some embodiments, the TAC is generated based on the K value and current C values maintained by the TAC module 324. The generation of the TAC in this step may be similar or identical to process step S302.

After the TAC for the interaction has been generated by the cryptographic engine 328, the NFC applet 316 of the smart tag 308 generates a data object 124 for transmission to the mobile device 304 (step 512). In some embodiments, the data object 124 comprises the tag data and the TAC. The TAC may correspond to a response-specific data 128 of the data object 124. The data object 124 may also optionally include a TAGID of the smart tag 308. The data object 124 may then optionally be signed as an additional authentication layer (step 516).

The data object 124 is then transmitted to the mobile device 304 (step 520). In some embodiments, the data object 124 is transmitted via one or more NDEF messages or NDEF records (e.g., via an inductive coupling between the smart tag 308 and mobile device 304). Alternatively or additionally, the data object 124 may be transmitted via a Bluetooth connection established between the mobile device 304 and smart tag 308. This particular step may be similar to process step S303.

Once the data object 124 has been transmitted by the smart tag 308, the method proceeds with the smart tag updating its counter value C (step 524) and waiting for the next read request (step 528). In some embodiments, updating the counter value C may comprise incrementing the current value C by a predetermined amount to a next counter value C plus predetermined increment amount.

Figure 6:
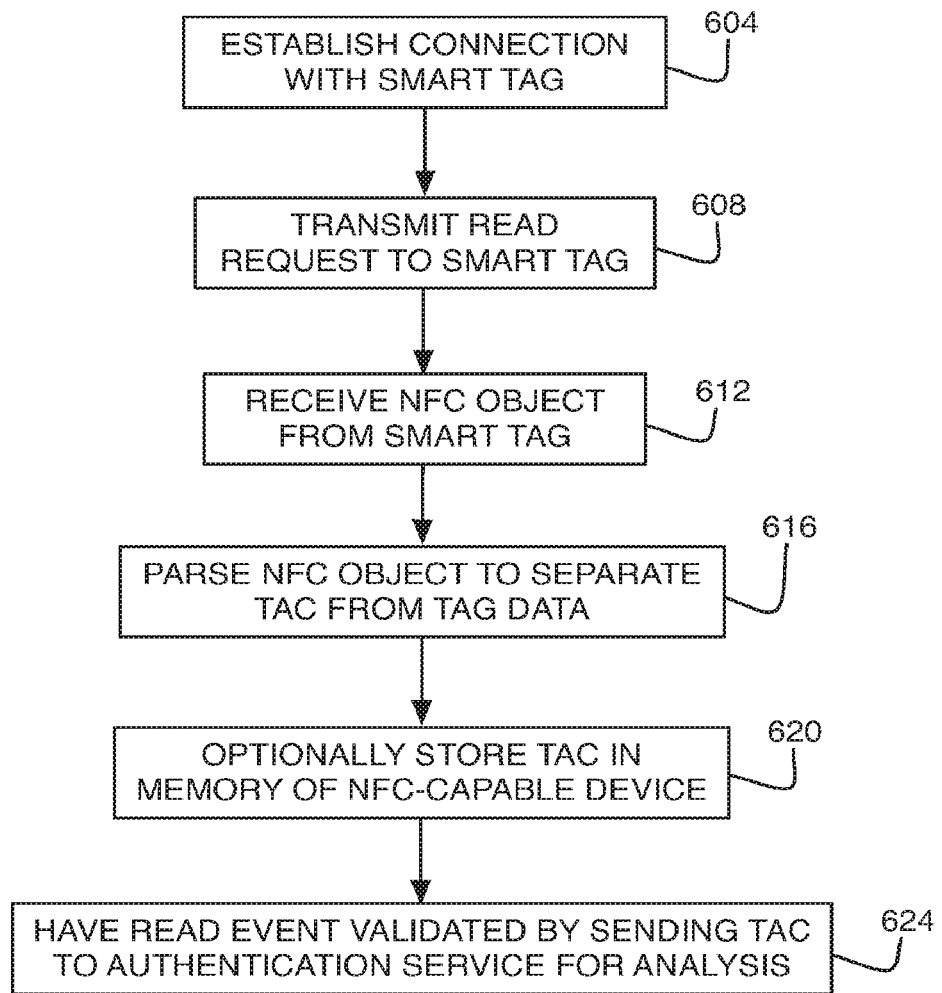
FIG. 6 is a flow diagram depicting a first method of interacting with a smart tag in accordance with embodiments of the present disclosure.

With reference now to FIG. 6, a first method of interacting with a smart tag 308 from a mobile device 304 will be described in accordance with embodiments of the present disclosure. The method begins with the mobile device 304 establishing a connection or communication channel with the smart tag 308 (step 604). In some embodiments, the connection may correspond to an NFC inductive coupling between the two devices. In some embodiments, the connection may correspond to a Bluetooth or WiFi connection between the two devices. It should be appreciated that the connection may be established automatically (e.g., without user input) or with the assistance of user input. Specifically, an NFC connection may be established automatically in response to the mobile device 304 being placed within a predetermined proximity of the smart tag 308. A Bluetooth connection, on the other hand, may be dependent upon the devices pairing with one another in a known fashion. Depending upon the protocol utilized the establish the connection, the predetermined distance required to achieve the connection may vary. For instance, an NFC connection may require the two devices to be within a few inches of one another whereas a Bluetooth connection may require the two devices to be within approximately twenty feet or so of one another. Further still, a WiFi connection may require the two devices to be within approximately one hundred feet or so of one another. Thus, the predetermined distance (e.g., the read range) may vary depending from protocol to protocol.

Once the connection is established between the two devices, the method proceeds with the mobile device 304 transmitting a read request to the smart tag 308 (step 608). The read request may comprise a request for only a UM of the smart tag 308 or a request for tag data. Eventually, the mobile device 304 receives a data object 124 from the smart tag 308 as a response to the read request, for instance (step 612). In an alternative configuration, the smart tag 308 may automatically generate a data object 124 or portions thereof, such as a TAC, every time a connection is established with a mobile device 304, regardless of whether or not the mobile device 304 has requested information from the smart tag 308. In this configuration, the smart tag 308 may store a TAC or other portions of a data object 124 in memory for a predetermined amount of time (e.g., as determined by a timer) until a read request is received from the mobile device 304. If such a request is not received within the predetermined amount of time, the smart tag 308 may erase the information that was automatically generated (e.g., the TAC) from its memory or re-write that memory location with other information. In still another alternative configuration, the smart tag 308 may generate a data object 124 or portions thereof, such as a TAC, in response to receiving an authentication request from the mobile device 304; thus, the smart tag 308 may generate a TAC in response to receiving an authentication request rather than in response to receiving a read request. Accordingly, it should be appreciated that step 608 may correspond to an optional step or such a step may be altered or replaced with some other form of interaction between the smart tag 308 and mobile device 304.

The data object 124 may comprise the tag data requested as well as additional optional information (e.g., an TAC and TAG Where the data object 124 comprises more than simple tag data, the mobile device 304 may optionally parse the data object 124 to separate the tag data from the TAC and/or TAGID (step 616). Alternatively, if the data object 124 is formatted properly, the mobile device 304 may not need to parse the data object 124 to separate the components thereof. Instead, the mobile device 304 may simply prepare and send the entire data object 124 to an authentication service 344 for analysis/validation (step 624). Of course, the data object 124 may be sent directly to the authentication service 344 or it may be transmitted to the content server 340, which subsequently provides the data object 124 (or potions thereof) to the authentication service 344. It should also be appreciated that the mobile device 304 may optionally store the TAC in its internal memory 408 (step 620). Storage of the TAC at the mobile device 304 may be used to facilitate additional checks or validations of the TAC at the mobile device 304 itself as will be discussed in further detail herein below.

Figure 7:
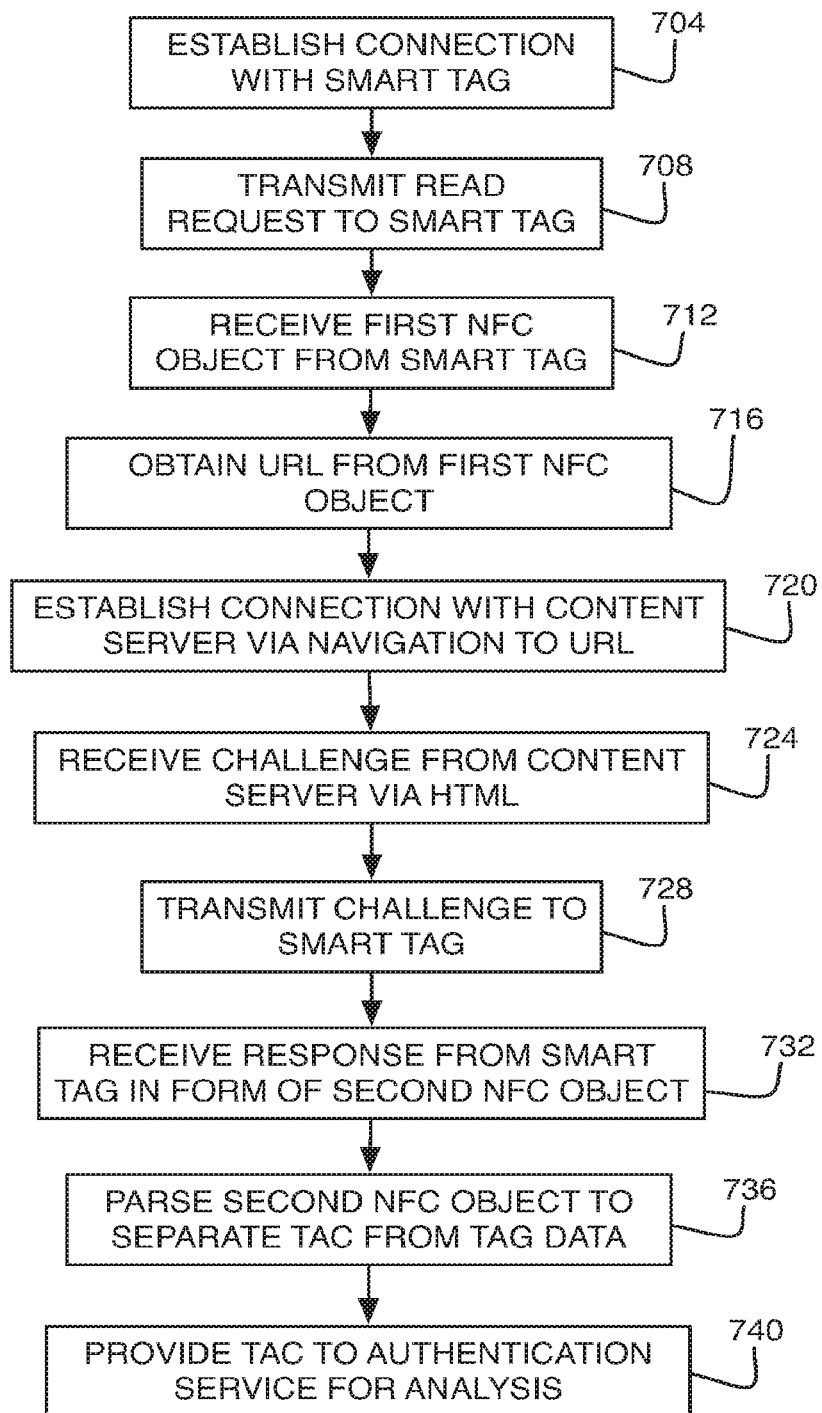
FIG. 7 is a flow diagram depicting a second method of interacting with a smart tag in accordance with embodiments of the present disclosure.

With reference now to FIG. 7, a second method of interacting with a smart tag 308 from a mobile device 304 will be described in accordance with embodiments of the present disclosure. The method begins with the mobile device 304 and smart tag 308 establishing a connection (step 704). This step may be similar or identical to step 604.

Thereafter, the mobile device 304 transmits a read request to the smart tag 308 (step 708) and receives a first data object in response thereto (step 712). The first data object may correspond to a URL or may contain a URL, that resolves to a content server 340. Accordingly, the method continues with the mobile device 304 obtaining the URL from the first data object (step 716) and then sending a request for content to the content server 340 by navigating its browser 424 to the URL (step 720). In this step, the mobile device 304 may establish a connection with the content server 340 by virtue of the fact that it has pointed its browser 336 toward the URL contained in the first data object.

The connection may allow the content server 340 to send a challenge back to the mobile device 304 (step 724). In particular, the content server 340 may provide the mobile device with a challenge or request for additional information in the form of an HTML file. The HTML file may not initially correspond to or contain the content referenced within the URL obtained from the first data object. Instead, the content server 340 may require additional authentication from the mobile device 304/smart tag 308 prior to providing the mobile device 304 with the requested content.

When the content server 340 sends the mobile device 304 the challenge, the mobile device 304 may respond by issuing a second read request to the smart tag 308 (step 728). Specifically, the mobile device 304 may transmit the challenge to the smart tag 308 in the second read request. The challenge may request response-specific information from the smart tag 308 instead of the static tag data (e.g., the URL that directed the mobile device 304 to the content server 340).

Accordingly, the mobile device 304 will receive a second response from the smart tag 308 in the form of a second data object (step 732). The second response may contain the response-specific information, such as an TAC, as well as an optional TAGID of the smart tag 308. The second response may also contain tag data, which may be the same or different from the tag data received in the first response.

The method continues with the mobile device 304 parsing the second data object to separate the URL, TAC, and/or TAGID (step 736). Once separated, the mobile device 304 may provide the TAC and/or TAGID back to the content server 340, perhaps also with the URL again (step 740). This information may be used by the content server 340 to determine if the smart tag 308 is a valid smart tag and if the interaction(s) between the smart tag 308 and mobile device 304 correspond to unique interaction(s).

Figure 8:
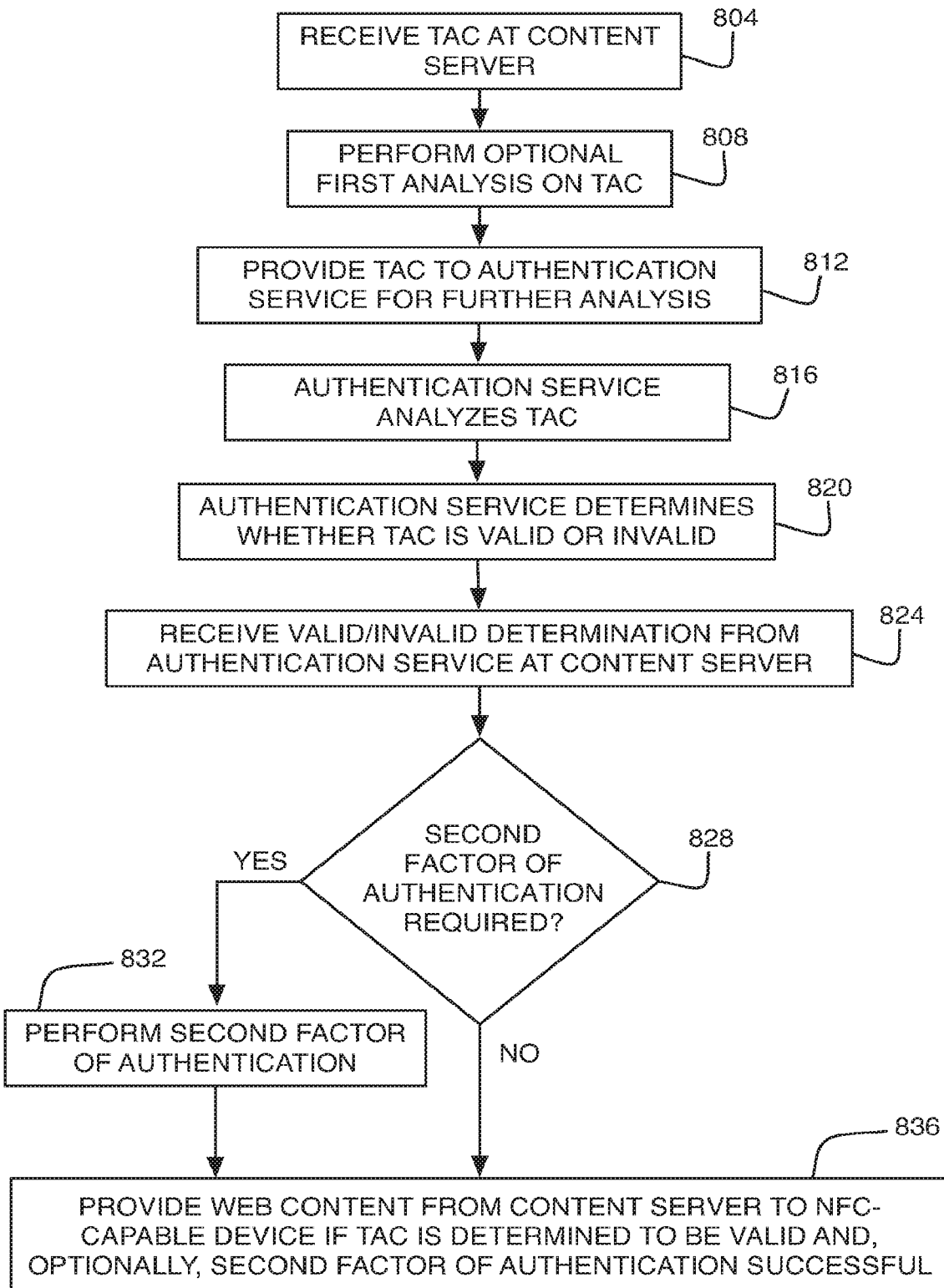
FIG. 8 is a flow diagram depicting a method of responding to a read event at a content server in accordance with embodiments of the present disclosure.

With reference now to FIG. 8, a method of responding to a request for content will be described in accordance with embodiments of the present disclosure. The method begins when the content server 340 receives a request for content along with an TAC (step 804). In some embodiments, the request for content is transmitted in an HTTP GET request. Of course, the content server 340 may be something other than a web server (e.g., an email server, messaging server, etc.). However, for ease of discussion, the example will be described in connection with a content server providing one or more web pages as content in response to a valid request for content. It should be appreciated that the TAC may be received at the same time as the request for content or it may be received in a different message.

The method continues with the content server 340 performing an optional first analysis on the TAC (step 808). As an example, the content server 340 may analyze the TAC to make sure the TAC does not correspond to a previously-received TAC or to ensure that the TAC is in a predetermined format (e.g., of the correct length, having the correct type of alphanumeric characters, having binary data, etc.). If the first analysis of the TAC by the content server 340 shows that the TAC is invalid, then the method will terminate.

Assuming that TAC is determined to be valid by the content server 340 (or the content server did not perform a first analysis), the method continues with the content server providing the TAC to the authentication service 344 for analysis (step 812). The TAGID of the smart tag 308 may also be provided to the authentication service 344 along with the TAC. Moreover, the TAC and/or TAGID may be provided to the content server 340 in one or more HTTP messages transmitted over the Internet and across one or more network border elements.

The method continues with the authentication service 344 analyzing the TAC and optionally the TAGID received from the content server 340 (step 816). As noted above, the analysis of the TAC is used to determine whether the interaction between the mobile device 304 and smart tag 308 was unique and the analysis of the TAGID is used to determine whether the smart tag 308 issued a valid TAGID (e.g., the smart tag 308 is a valid and trusted tag).

Based on the analysis performed in step 816, the authentication service 344 determines whether the TAC was valid or invalid and optionally whether the TAGID is valid or invalid (step 820). Results of this determination are provided back to the content server 340 (step 824). If the authentication service 344 informs the content server 340 that the TAC or TAGID was invalid, then the method ends.

On the other hand, if the TAC and TAGID were both determined to be valid, then the content server 340 continues by determining whether a second factor of authentication is required (step 828). If this query is answered negatively, then the content server 340 provides the requested content (e.g., requested web page, HTML document, etc.) back to the mobile device 304 (step 836). If the query of step 828 is answered positively, then the content server 340 will issue a request for additional information to the mobile device 304 (step 832). In some embodiments, the content server 340 may provide the mobile device 304 with a secure portal page that allows the user of the mobile device 304 to input their user name and/or password as a second factor of authentication. Alternatively or additionally, the user may be required to perform some level of biometric authentication in step 832. If the second factor of authentication is determined to be valid, then the content server 340 will provide the mobile device 304 with the requested content in step 836; otherwise, the content server 340 will not provide the requested content.

Figure 9:
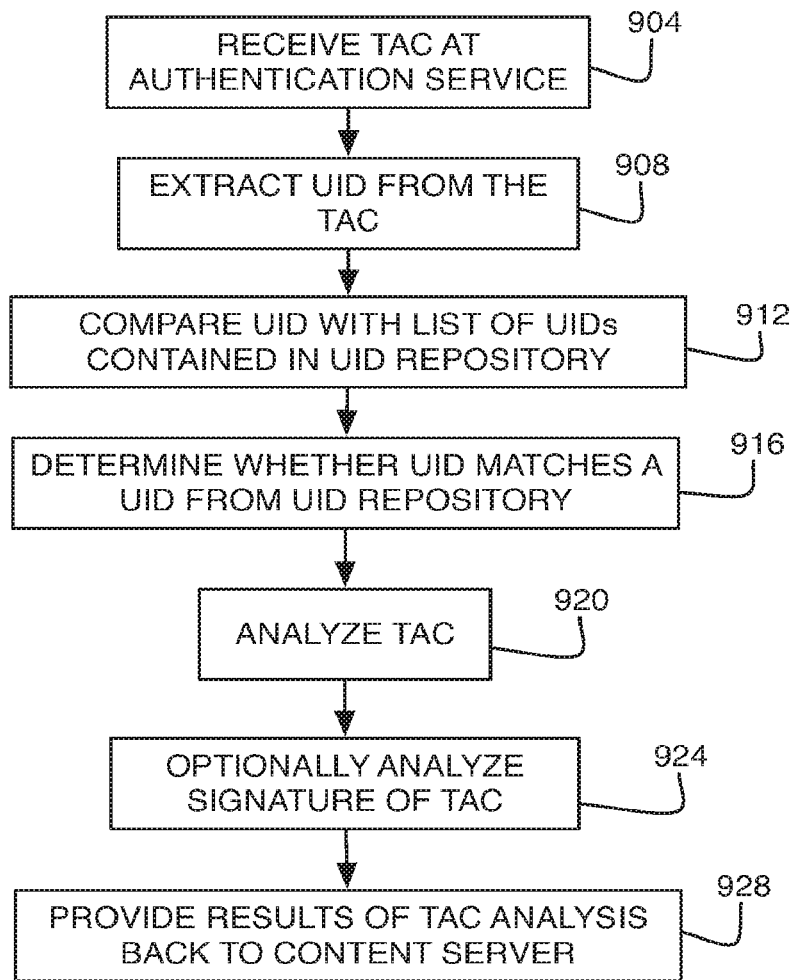
FIG. 9 is a flow diagram depicting an authentication method in accordance with embodiments of the present disclosure.

With reference now to FIG. 9, an authentication method will be described in accordance with embodiments of the present disclosure. The method begins with the authentication service 344 receiving the TAC and TAGID issued by a smart tag 308 in response to a read request from a mobile device 304 (step 904). In some embodiments, the TAC and TAGID are received from a content serer 340, In some embodiments, the TAC and TAGID are received directly from a mobile device 304.

The authentication service 344 separates the TAGID from the TAC, if such a separation is necessary (step 908), In particular, if the TAGID and TAC are contained within a common data object, such as a URL then the authentication service parses the data object to separate the TAC from the TAGID. The TAGID is then compared with one or more TAGIDs contained within the TAGID repository 348 (step 912). The authentication service 344 then determines if the received TAGID matches a TAGID from the TAGID repository 348 (step 916).

The authentication service 344 is also configured to analyze the TAC with its cryptographic engine 352 to determine whether the TAC is valid (step 920), Specifically, the authentication service 344 is able to determine whether the interaction between the mobile device 304 and smart tag 308 was unique based on whether the received TAC is unique and corresponds to an expected TAC. The analysis of the TAC may occur prior to, simultaneous with, or after the analysis of the TAGID.

The method proceeds with the authentication service 344 optionally analyzing a signature of the TAC (e.g., a signature generated by the smart device 308) (step 924). In particular, the authentication service 344 may analyze the signature to determine whether the signature was generated with a valid key or whether the key used to generate the signature is wrong or expired. The analysis of the signature may be performed by using a private/public key pair. Specifically, the authentication service 344 may analyze the signature with a public key that corresponds to a private key written to the smart tag 308 during provisioning.

After the TAC, TAGID, and optionally the signature, have been analyzed, the authentication service 344 provides the content server 340 with results of the analysis (step 928). As an example, the authentication service 344 may inform the content server 340 that the TAC and TAGID are valid, thereby allowing the content server 340 to release the requested content. Alternatively, if the OID, TAGID, and/or signature are determined to be invalid, then the authentication service 344 may instruct the content server 340 to withhold the requested content.

It is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A device comprising:
   memory storing a unique value that is substantially unique to the device and a counter value;
   memory configured for storing first data;
   program code that invokes a cryptographic engine to generate a unique authentication code using the unique value and the counter value; and
   program code that generates a NFC Data Exchange Format (NDEF) message comprising the first data and the unique authentication code, but not the counter value.

2. The device of claim 1, wherein the unique value is a cryptographic key.

3. The device of claim 1, comprising executable code for updating the counter value.

4. The device of claim 3, wherein the executable code for updating the counter value updates the counter value according to a specified algorithm.

5. The device of claim 4, wherein the specified algorithm increments the counter value by a specified amount for each update to the counter value.

6. The device of claim 4, wherein the specified algorithm comprises a pseudo-random number generator.

7. The device of claim 1, wherein the first data comprises a uniform resource locator (URL) of an authentication service.

8. The device of claim 1, wherein the cryptographic engine comprises a hash function that receives the unique identifier and counter value and returns a hash value as the unique authentication code.

9. The device of claim 7, wherein the cryptographic engine comprises a hash function that receives the unique identifier and counter value and returns a hash value as the unique authentication code.

10. The device of claim 9, wherein the NDEF message comprises a response URL comprising the URL of the authentication service appended with at least the unique authentication code.

11. A device comprising:
    memory storing a seed comprising a unique value that is substantially unique to the device and a counter value, wherein the seed has been communicated with an authentication service;
    memory configured for storing first data;
    program code that invokes a cryptographic engine to generate a unique authentication code using the unique identifier and the counter value;
    program code that generates a NFC Data Exchange Format (NDEF) message comprising the first data and the unique authentication code; and
    at least one of hardware or program code for updating the counter value.

12. The device of claim 11, wherein the counter value stored in memory of the device and a corresponding counter value of the seed communicated with the authentication server are updated independently from one another.

13. The device of claim 12, wherein the at least one of hardware or program code for updating the counter value updates the counter value stored in memory of the device according to a specified algorithm.

14. The device of claim 13, wherein the specified algorithm increments the counter value stored in memory of the device by a specified amount for each update to the counter value.

15. The device of claim 13, wherein the specified algorithm comprises a pseudo-random number generator.

16. The device of claim 11, wherein the unique value is a cryptographic key.

17. The device of claim 11, wherein the first data comprises a uniform resource locator (URL) of the authentication service.

18. The device of claim 11, wherein the cryptographic engine comprises a hash function that receives the unique identifier and counter value and returns a hash value as the unique authentication code.

19. The device of claim 17, wherein the cryptographic engine comprises a hash function that receives the unique identifier and counter value and returns a hash value as the unique authentication code.

20. The device of claim 19, wherein the NDEF message comprises a response URL comprising the URL of the authentication service appended with at least the unique authentication code.

21. A device comprising:
    memory storing a unique value that is substantially unique to the device, a key value, and a counter value;
    memory configured for storing first data;
    program code that invokes a cryptographic engine to generate a unique authentication code using the key value and the counter value; and
    program code that generates a NFC Data Exchange Format (NDEF) message comprising the first data, the unique value, and the unique authentication code, but not the counter value.

22. The device of claim 21, comprising at least one of hardware or program code for updating the counter value.

23. The device of claim 22, wherein the at least one of hardware or program code for updating the counter value updates the counter value according to a specified algorithm.

24. The device of claim 23, wherein the specified algorithm increments the counter value by a specified amount for each update to the counter value.

25. The device of claim 23, wherein the specified algorithm comprises a pseudo-random number generator.

26. The device of claim 23, wherein the first data comprises a uniform resource locator (URL) of an authentication service.

27. The device of claim 21, wherein the cryptographic engine comprises a hash function that receives the key value and counter value and returns a hash value as the unique authentication code.

28. The device of claim 26, wherein the cryptographic engine comprises a hash function that receives the key value and counter value and returns a hash value as the unique authentication code.

29. The device of claim 28, wherein the NDEF message comprises a response URL comprising the URL of the authentication service appended with at least the unique authentication code.

30. The device of claim 29, wherein the response URL comprises the URL of the authentication service appended with the unique value and the unique authentication code.

31. A device comprising:
- memory storing a unique value that is substantially unique to the device and a counter value;
- memory configured for storing first data;
- means for invoking a cryptographic engine to generate a unique authentication code using the unique value and the counter value; and
- means for generating a NFC Data Exchange Format (NDEF) message comprising the first data and the unique authentication code, but not the counter value.

* * * * *